(12) United States Patent
Griffith

(10) Patent No.: US 12,504,573 B2
(45) Date of Patent: Dec. 23, 2025

(54) EXTERNAL POWER BANK AND COLLAPSIBLE HOLOGRAPHIC PROJECTION ACCESSORY FOR PORTABLE ELECTRONIC DEVICE

(71) Applicant: IKIN, Inc., San Diego, CA (US)

(72) Inventor: Taylor Scott Griffith, Austin, TX (US)

(73) Assignee: IKIN, Inc., Dripping Springs, TX (US)

( * ) Notice: Subject to any disclaimer, the term of this patent is extended or adjusted under 35 U.S.C. 154(b) by 227 days.

(21) Appl. No.: 18/446,646

(22) Filed: Aug. 9, 2023

(65) Prior Publication Data

US 2024/0061162 A1     Feb. 22, 2024

Related U.S. Application Data

(63) Continuation of application No. 17/845,907, filed on Jun. 21, 2022.
(Continued)

(51) Int. Cl.
    *G02B 5/32*      (2006.01)
    *G02B 27/00*     (2006.01)
    (Continued)

(52) U.S. Cl.
    CPC ........... *G02B 5/32* (2013.01); *G02B 27/0093* (2013.01); *G02B 27/0103* (2013.01);
    (Continued)

(58) Field of Classification Search
CPC .. G02B 5/32; G02B 27/0093; G02B 27/0103; G02B 27/0117; G02B 27/142; G02B 27/144; G02B 2027/0109; G02B 2027/0112; G02B 2027/0187; G02F 1/1607; G02F 1/1635
(Continued)

(56) References Cited

U.S. PATENT DOCUMENTS

D318,284 S    7/1991    Kwok Wah Lo
D318,478 S    7/1991    Wah Lo
(Continued)

FOREIGN PATENT DOCUMENTS

CN        1426168 A     6/2003
CN    101938538 A     1/2011
(Continued)

OTHER PUBLICATIONS

International Preliminary Report on Patentability for International Application No. PCT/US2020/022186 mailed on Sep. 23, 2021, 8 Pages.
(Continued)

*Primary Examiner* — Sharrief I Broome
(74) *Attorney, Agent, or Firm* — Cooley LLP

(57) ABSTRACT

A power bank and holographic projection accessory intended for use with a portable electronic device. The accessory includes a holographic projection unit and an external power bank case attachable to the holographic projection unit. The external power bank case is configured to provide power to the holographic projection unit and to provide a video signal generated by the portable electronic device to the holographic projection unit. The holographic projection unit generates volumetric projections based upon the video signal.

17 Claims, 33 Drawing Sheets

Related U.S. Application Data

(60) Provisional application No. 63/213,138, filed on Jun. 21, 2021.

(51) Int. Cl.
  *G02B 27/01* (2006.01)
  *G02B 27/14* (2006.01)
  *G06F 1/16* (2006.01)

(52) U.S. Cl.
  CPC ....... *G02B 27/0179* (2013.01); *G02B 27/142* (2013.01); *G02B 27/144* (2013.01); *G06F 1/1607* (2013.01); *G06F 1/1635* (2013.01); *G02B 2027/0109* (2013.01); *G02B 2027/0112* (2013.01); *G02B 2027/0187* (2013.01)

(58) Field of Classification Search
  USPC .......................................................... 359/15
  See application file for complete search history.

(56) References Cited

U.S. PATENT DOCUMENTS

| | | |
|---|---|---|
| D329,448 S | 9/1992 | Lo |
| 5,677,701 A | 10/1997 | Okuyama et al. |
| D410,450 S | 6/1999 | Solero |
| 6,481,851 B1 | 11/2002 | McNelley et al. |
| 6,637,896 B2 | 10/2003 | Li et al. |
| 6,710,797 B1 | 3/2004 | McNelley et al. |
| D555,656 S | 11/2007 | Bishop et al. |
| D560,668 S | 1/2008 | Pritchard et al. |
| D608,380 S | 1/2010 | Nagase et al. |
| 8,264,823 B2 | 9/2012 | Kim et al. |
| D671,939 S | 12/2012 | Chung |
| D685,779 S | 7/2013 | Schriefer et al. |
| D687,877 S | 8/2013 | Chang |
| D698,773 S | 2/2014 | Wildner |
| D699,205 S | 2/2014 | Kim et al. |
| D703,626 S | 4/2014 | Hermansen |
| 8,820,936 B2 | 9/2014 | Chen |
| D730,854 S | 6/2015 | Jung |
| D732,489 S | 6/2015 | Kumano et al. |
| D735,709 S | 8/2015 | Daniel |
| D739,838 S | 9/2015 | Lang et al. |
| D741,854 S | 10/2015 | Daniel |
| D743,922 S | 11/2015 | Li et al. |
| D759,659 S | 6/2016 | Lee et al. |
| D761,790 S | 7/2016 | Yamazaki |
| D763,839 S | 8/2016 | Shin et al. |
| 9,723,246 B2 | 8/2017 | Thomas |
| D796,570 S | 9/2017 | Peng et al. |
| D812,605 S | 3/2018 | Senda |
| D816,627 S | 5/2018 | Kim et al. |
| D836,077 S | 12/2018 | Cho et al. |
| D841,719 S | 2/2019 | Flores Meneses et al. |
| D859,396 S | 9/2019 | Lee |
| D927,635 S | 8/2021 | Choi et al. |
| D930,559 S | 9/2021 | Diboine et al. |
| D930,604 S | 9/2021 | Pyo et al. |
| D934,826 S | 11/2021 | Wang |
| 11,258,890 B2 | 2/2022 | Griffith |
| D969,640 S | 11/2022 | Burkardt et al. |
| D969,803 S | 11/2022 | Zhu |
| D973,655 S | 12/2022 | Chang et al. |
| D988,277 S | 6/2023 | Griffith |
| D994,011 S | 8/2023 | Griffith |
| 11,792,311 B2 | 10/2023 | Griffith |
| D1,009,969 S | 1/2024 | Griffith |
| 2002/0058531 A1 | 5/2002 | Terasaki et al. |
| 2003/0114200 A1 | 6/2003 | Lee |
| 2006/0145947 A1 | 7/2006 | Arneson et al. |
| 2007/0121087 A1 | 5/2007 | Garg |
| 2008/0068565 A1 | 3/2008 | Ko |
| 2008/0212271 A1 | 9/2008 | Misawa |
| 2009/0128785 A1 | 5/2009 | Silverstein |
| 2010/0045569 A1* | 2/2010 | Estevez .............. H04M 1/0272 345/3.1 |
| 2010/0097439 A1 | 4/2010 | Kroll et al. |
| 2011/0037952 A1 | 2/2011 | LaDuke et al. |
| 2012/0127320 A1 | 5/2012 | Balogh |
| 2012/0287503 A1 | 11/2012 | Mase |
| 2012/0300275 A1 | 11/2012 | Vilardell et al. |
| 2013/0187950 A1 | 7/2013 | Nowatzyk |
| 2014/0118807 A1 | 5/2014 | Su |
| 2014/0253991 A1 | 9/2014 | Vilardell et al. |
| 2016/0041522 A1 | 2/2016 | Brasil et al. |
| 2016/0070304 A1 | 3/2016 | Shin et al. |
| 2016/0145947 A1* | 5/2016 | Myers ....................... H02J 3/00 52/64 |
| 2016/0165208 A1 | 6/2016 | Liu et al. |
| 2016/0306323 A1* | 10/2016 | Thomas ................ G02B 30/56 |
| 2017/0205854 A1 | 7/2017 | Zenoff |
| 2017/0236491 A1* | 8/2017 | Foster ...................... G09G 5/14 345/173 |
| 2017/0322513 A1 | 11/2017 | Zapanta |
| 2019/0196188 A1 | 6/2019 | Hirata et al. |
| 2020/0213433 A1* | 7/2020 | Griffith .................... G03H 1/02 |
| 2020/0400945 A1 | 12/2020 | Fischer et al. |
| 2022/0050287 A1 | 2/2022 | Vanderlofske, III et al. |
| 2022/0078271 A1 | 3/2022 | Griffith |
| 2022/0196894 A1 | 6/2022 | Griffith |
| 2022/0404536 A1 | 12/2022 | Griffith |
| 2022/0404537 A1 | 12/2022 | Griffith |

FOREIGN PATENT DOCUMENTS

| | | |
|---|---|---|
| CN | 102012618 A | 4/2011 |
| CN | 202339472 U | 7/2012 |
| CN | 202838896 U | 3/2013 |
| CN | 104054027 A | 9/2014 |
| CN | 203941674 U | 11/2014 |
| CN | 104935917 A | 9/2015 |
| CN | 205067959 U | 3/2016 |
| CN | 105474638 A | 4/2016 |
| CN | 206311897 U | 7/2017 |
| CN | 206684482 U | 11/2017 |
| CN | 111711279 A | 9/2020 |
| CN | 307756611 | 12/2022 |
| EP | 1678529 A1 | 7/2006 |
| EP | 3451661 A1 | 3/2019 |
| ES | 2406205 A2 | 6/2013 |
| FR | 3022040 A1 | 12/2015 |
| GB | 2508404 A | 6/2014 |
| JP | 2005517986 A | 6/2005 |
| JP | 2009134147 A | 6/2009 |
| JP | 3180075 U | 12/2012 |
| JP | 2015176141 A | 10/2015 |
| JP | 2017531212 A | 10/2017 |
| JP | 2018501499 A | 1/2018 |
| KR | 20150120712 A | 10/2015 |
| KR | 3008966560000 | 3/2017 |
| RU | 2556291 C2 | 7/2015 |
| WO | WO-2009134228 A1 | 11/2009 |
| WO | WO-2011045437 A1 | 4/2011 |
| WO | WO-2014073093 A1 | 5/2014 |
| WO | WO-2016047914 A1 | 3/2016 |
| WO | WO-2016075437 A1 | 5/2016 |
| WO | WO-2017116426 A1 | 7/2017 |
| WO | WO-2018012541 A1 | 1/2018 |
| WO | WO-2020185963 A1 | 9/2020 |
| WO | WO-2022140678 A1 | 6/2022 |
| WO | WO-2022271754 A2 | 12/2022 |
| WO | WO-2022271755 A1 | 12/2022 |

OTHER PUBLICATIONS

International Preliminary Report on Patentability for International Application No. PCT/US2022/034416 mailed Dec. 14, 2023, 11 pages.

International Preliminary Report on Patentability for International Application No. PCT/US2022/034418 mailed on Jan. 4, 2024, 9 Pages.

(56) References Cited

OTHER PUBLICATIONS

Design U.S. Appl. No. 29/795,090, filed Jun. 16, 2021; Inventor Griffith, Taylor Scott.

Design U.S. Appl. No. 29/795,845, filed Jun. 21, 2021; Inventor Griffith, Taylor Scott.

Avery, et al., Kitware, Desktop Holograms for Materials Science, available at kitware.com, date published Jul. 5, 2021, site visited Jan. 12, 2023, 10 pages. https://www.kitware.com/holograms-how-to-with-tomviz/.

Cauchard, et al. Steerable projection: exploring alignment in interactive mobile displays, Personal and Ubiquitous Computing, Jan. 2012, pp. 27-37.

European Patent Office, Extended European Search Report for European Application No. 20770258.0, Nov. 9, 2022, 9 pages.

European Patent Office, International Search Report and Written Opinion for International Application No. PCT/US2021/065095, Apr. 13, 2022, 14 pages.

European Patent Office, Invitation to Pay Additional Fees and, Where Applicable, Protest Fees for International Application No. PCT/US2022/034416, Nov. 14, 2022, 12 pages.

Hamblen, IKIN ships holographic ARC terminal with no need for goggles, Jun. 2022, 2 pages. URL: https://www.fierceelectronics.com/sensors/ikin-arc-ships-commercial-holographic-desktop-terminal-no-need-goggles.

Holographic Presentation of 3D Data Becoming a Realit—IKIN at CES 2021, publication date Jan. 15, 2021, 2pages.

International Preliminary Report on Patentability for International Application No. PCT/US2021/065095 dated Jul. 6, 2023, 8 pages.

International Search Report and Written Opinion for Application No. PCT/US2022/034418, mailed on Oct. 12, 2022, 14 pages.

International Search Report and Written Opinion for International Application No. PCT/US2022/034416 dated Jan. 16, 2023, 19 pages.

Samsung Galaxy S11 with docking station for aerial projection, Sep. 2019, 10 pages. Retrieved from: https://nl.letsgodigital.org/smartphones/samsung-smartphone-docking-station-3d-hologram/.

United States Patent and Trademark Office, International Search Report and Written Opinion, Jul. 16, 2020 for International Application No. PCT/US2020/022186, 11 pages.

\* cited by examiner

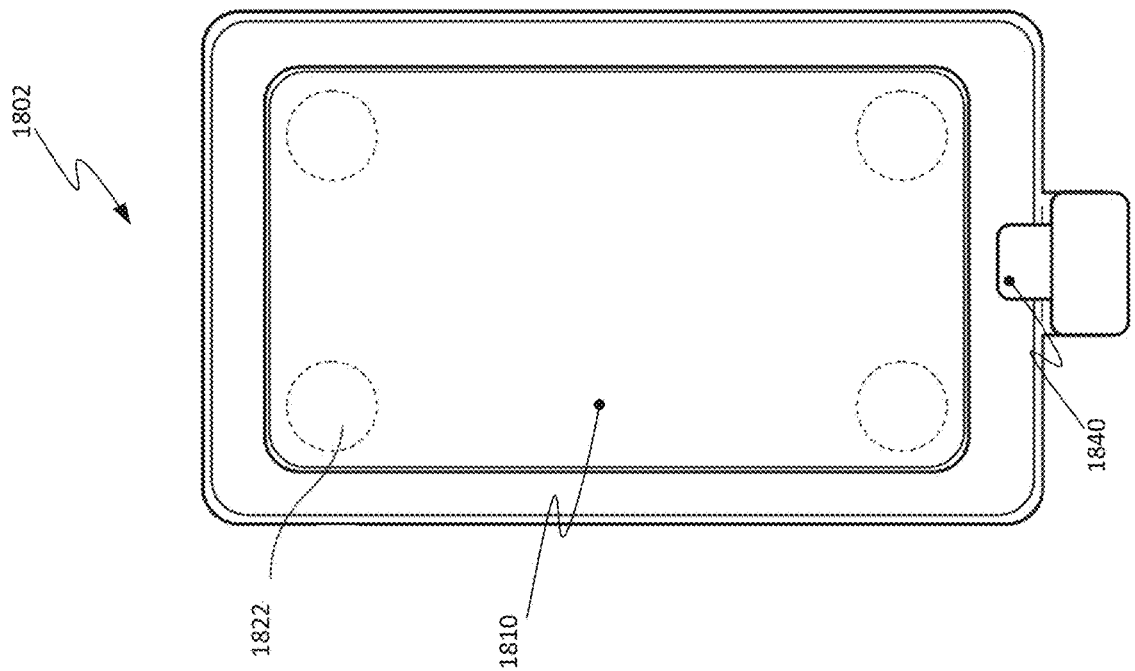
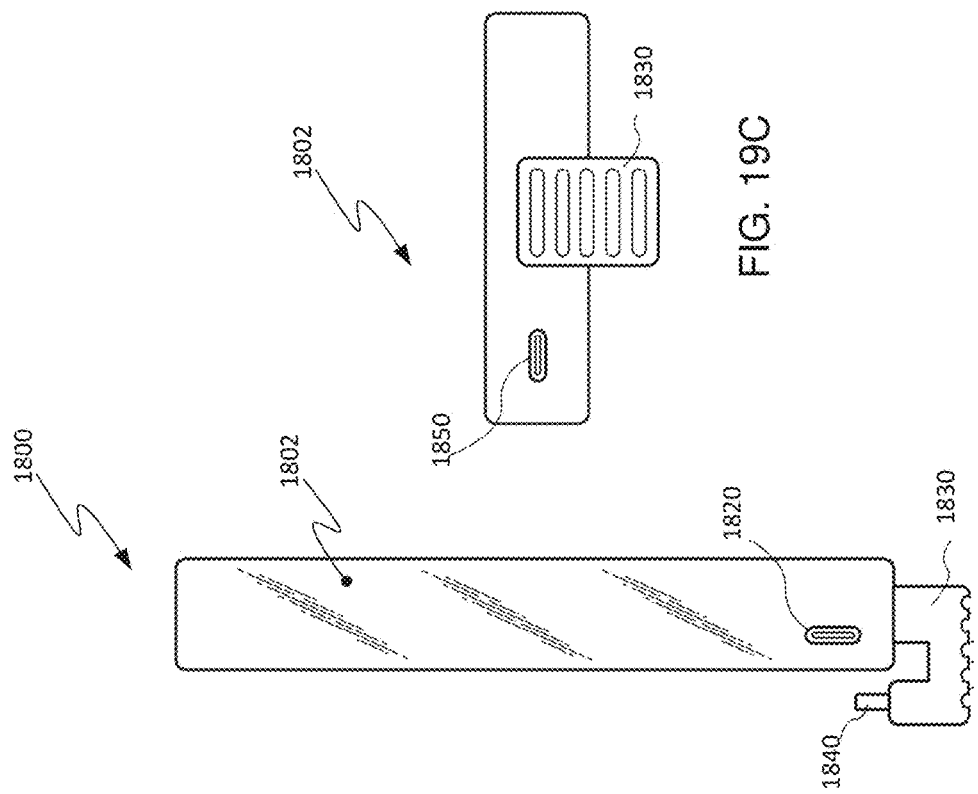

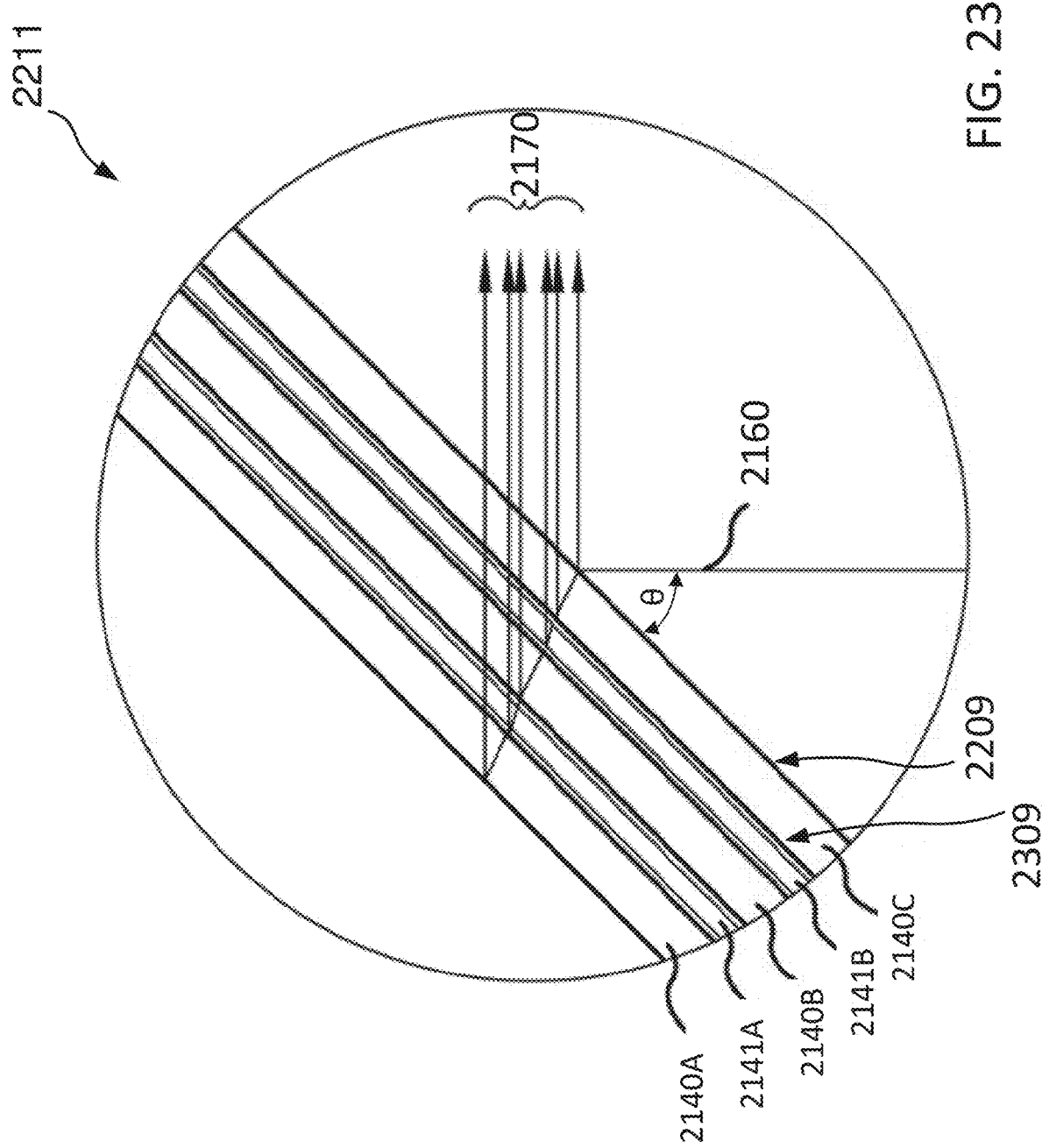

EXTERNAL POWER BANK AND COLLAPSIBLE HOLOGRAPHIC PROJECTION ACCESSORY FOR PORTABLE ELECTRONIC DEVICE

CROSS REFERENCE TO RELATED APPLICATIONS

This application is a continuation of U.S. patent application Ser. No. 17/845,907, entitled EXTERNAL POWER BANK AND COLLAPSIBLE HOLOGRAPHIC PROJECTION ACCESSORY FOR PORTABLE ELECTRONIC DEVICE, filed Jun. 21, 2022, which claims the benefit of priority under 35 U.S.C. § 119(e) of U.S. Provisional Application No. 63/213,138, entitled EXTERNAL POWER BANK AND COLLAPSIBLE HOLOGRAPHIC PROJECTION ACCESSORY FOR PORTABLE ELECTRONIC DEVICE, filed Jun. 21, 2021. This application is related to U.S. patent application Ser. No. 16/816,154, entitled PORTABLE TERMINAL ACCESSORY DEVICE FOR HOLOGRAPHIC PROJECTION AND USER INTERFACE, filed Mar. 11, 2020, and published Jul. 2, 2020, and to U.S. patent application Ser. No. 17/845,942, entitled ADAPTIVE HOLOGRAPHIC PROJECTION SYSTEM WITH USER TRACKING, filed on Jun. 21, 2022, the contents of which are incorporated herein in their entirety for all purposes.

FIELD

The invention relates to display systems for portable electronic devices and, more particularly, to auxiliary power and display systems for use with such devices.

BACKGROUND

Mobile phones, tablets, laptop/desktop computers and other electronic devices have become mainstay consumer devices. In recent years the addition of Augmented Reality (AR) software development and implementation have allowed developers to create immersive and interactive environments. However, both general electronics usage as well as AR software, are dependent on 2D screen technology and camera control to create these environments, thus creating difficulty for developers and frustration for consumers.

Virtual Reality (VR) and AR goggle or headset systems have also been created in an attempt to further improve the electronic experience. However, many issues arise for developers of VR and AR systems such as, for example, difficulty of programming, heavy CPU usage, difficulty of manufacture, and the like. The use of AR and VR systems may also have negative consequences for consumers. For example, some users of VR and AR equipment experience eye strain, headaches, migraines, nausea, and may be simply generally uncomfortable when using such equipment.

With the increase in AR software sophistication and the mass user desire to enjoy augmented environments, a functional improvement of AR projection and experience is necessary to further improve the growth of enhanced reality systems.

Mobile devices utilizing AR software are typically powered by battery power sources. Such battery power sources are often housed within the mobile device and may be changed and/or recharged as needed. However, the ever more powerful mobile devices being regularly released tend to consume power more quickly, thereby shortening the time between charges. This tends to limit the usefulness of the mobile device since the user must find a power source to recharge the battery source and wait until it is recharged.

Additionally, after a certain number of recharges, a battery source may need to be replaced as it may no longer hold a charge. Oftentimes, it is not easy to replace a battery source as the mobile device may need to be disassembled or opened to reach the battery source.

SUMMARY

Disclosed herein is an external power bank and holographic projection accessory intended for use with a portable electronic device, such as a mobile phone. The accessory includes an external power bank case and a holographic projection unit detachable from the external power bank case. The external power bank case may attach to the mobile phone or other device via a magnetic connection facilitated by a mounting plate adhesively secured to a rear surface of the device. When connected to the mobile phone the external power bank case effectively acts as a phone case replacement. The external power bank case may incorporate ports and interfaces for providing power to the mobile phone and to the holographic screen assembly, for receiving video and other data from the mobile phone, and for functioning essentially as a pass-through to provide video data to the holographic screen assembly.

The holographic projection unit is configured for volumetrically rendering an image or video signal provided by the mobile phone or other portable electronic device. The video signal may be received from the mobile phone either wirelessly or after being relayed by the external power bank case. The holographic projection unit provides a compact and conveniently portable rendering environment capable of collapsing and being carried with ease when detached from the external power bank case. When attached to the external power bank case, the holographic projection unit may be opened, by a lens-slide hinge system disclosed herein, from a collapsed state to an open state suitable for reflective viewing. The holographic projection unit may also be powered on in response to actuation of a power switch disposed on the external power bank case. The holographic projection unit will generally be detached from the external power bank case when not in use and attached when being used.

The holographic projection unit enables numerous computation devices, and in particular mobile phones, to render new experiences. By leveraging touch control and user facial tracking, vastly new illusionary, holographic and even volumetric experiences can be created with the same ease as creating a standard mobile application.

The holographic projection unit may include a protective casing, foil or transparent reflective surface such as a beam splitter, touch screen, and a projector. The projector may be comprised of a Liquid Crystal Display (LCD) screen, Organic Light-Emitting Diode (OLED) screen, image projector or other type of image projection device. The holographic projection unit is preferably designed with collapsible hinges and a lens-slide hinge system, thereby permitting the holographic view-field to be compressed into a convenient, user-friendly size, and subsequently reopened.

The video signal provided by the mobile phone can be sent to the external power bank case, for relay to the holographic projection unit, via the standard electronic signal input port per device, Universal Serial Bus (USB), USB-C, Lightning connector, HDMI, and translated by the accessory into a holographic projection.

The touch screen provides users with touch control, which when sent back to the operating system of the mobile device via the external power bank case, allows for control of the holographically projected environment. In one implementation the foil or transparent reflective surface is implemented as a holofoil screen comprised of a transparent reflector such as Gorilla glass or the equivalent, with a high-refractive index polymer overlay. The holofoil screen will typically be similar or identical in size as the projector (e.g., LCD screen).

The substantially transparent touch screen may be mechanically supported by a frame structure integral with, or coupled to, a base connector of the accessory. A first hinge element is supported by a top frame member which extends rearward from a top of the touch screen frame structure and which is generally perpendicular to a plane of the touch screen. A first end of the holofoil screen is attached to the first hinge element and is movable between a closed or collapsed position in which it is substantially parallel to the touch screen and an open position in which it is disposed at approximately a 45 degree angle relative to the plane of the touch screen. In the collapsed state the LCD projector is substantially parallel to, and interposed between, the touch screen and the holofoil screen. A bottom of the LCD projector housing is connected to a second hinge element abutting a bottom of the touch screen frame structure. By rotating at the second hinge element the LCD projection may move between the closed or collapsed position and an open position in which the LCD projector is at an angle of approximately 90 degrees relative to the touch screen. In the open position a top of the LCD projector housing forms an angle of approximately 45 degrees with the holofoil screen. When transitioning between the open and collapsed states, the holofoil slides through a slot defined in a foil positioning member coupled to a dual hinge element affixed to the top of the LCD projector housing.

The holographic projection unit may receive, either wirelessly or via the external power bank case, video or other data input from the mobile phone or other portable device and volumetrically project the received input into a holographic display field. The holographic projection unit is configured with the capability to accept user input, such as through a touch screen disposed within or proximate the holographic display field. This allows for a multiplicity of high-level programming and user input functions to be received by the holographic projection unit and to be provided by the accessory to the a user's mobile phone.

During operation of the accessory, when placed is placed in the open state the holographic projection unit is configured to generate holographic images based upon the video signal or other image information provided by the mobile phone. When placed in the closed or collapsed state, the holographic projection unit assumes a generally planar form. In one embodiment the holographic projection unit may transition to the collapsed state from the open state either while attached to the external power bank case or after being detached from it.

The holographic projection unit is configured with the capability to accept user input, such as through a touch screen disposed within or proximate the holographic display field. This allows for a multiplicity of high-level programming and user input functions to be received by the holographic projection unit and to be provided by the accessory to the user's mobile phone. During operation of the holographic projection unit the transparent reflective surface is used to project a holographic viewing field, which creates a holographic effect proximate the viewing space of the mobile phone or other electronic device.

In one particular aspect the disclosure relates to holographic projection unit including a frame structure and a touch screen supported by the frame structure. The holographic projection unit further includes a projector having a first end coupled to the frame structure by a first hinge element. The projector includes a projector screen for generating images. A semi-reflective element is coupled to the frame structure by a second hinge element. The reflective element is moveable between an open position and a closed position and is oriented to reflect light from the images when in the open position in order to create volumetric images perceptible to a user of the holographic projection unit. A slide hinge system is disposed at a second end of the projector. The slide hinge system includes a positioning member through which the reflective element is translated when moving between the open position and a closed position.

The disclosure also pertains to a power bank and holographic projection accessory intended for use with a portable electronic device. The accessory includes a holographic projection unit and an external power bank case attachable to the holographic projection unit. The external power bank case is configured to provide power to the holographic projection unit and to provide a video signal generated by the portable electronic device to the holographic projection unit. The holographic projection unit generates volumetric projections based upon the video signal.

BRIEF DESCRIPTION OF THE DRAWINGS

For a better understanding of the nature and objects of various embodiments of the invention, reference should be made to the following detailed description taken in conjunction with the accompanying drawings, wherein:

FIGS. 19B-19D are side, bottom and front views, respectively, of an external power bank case.

FIG. 23 depicts a cross section of the micro-layered reflector structure and reflected light beam referenced in FIG. 22A.

DETAILED DESCRIPTION

Figure 1:
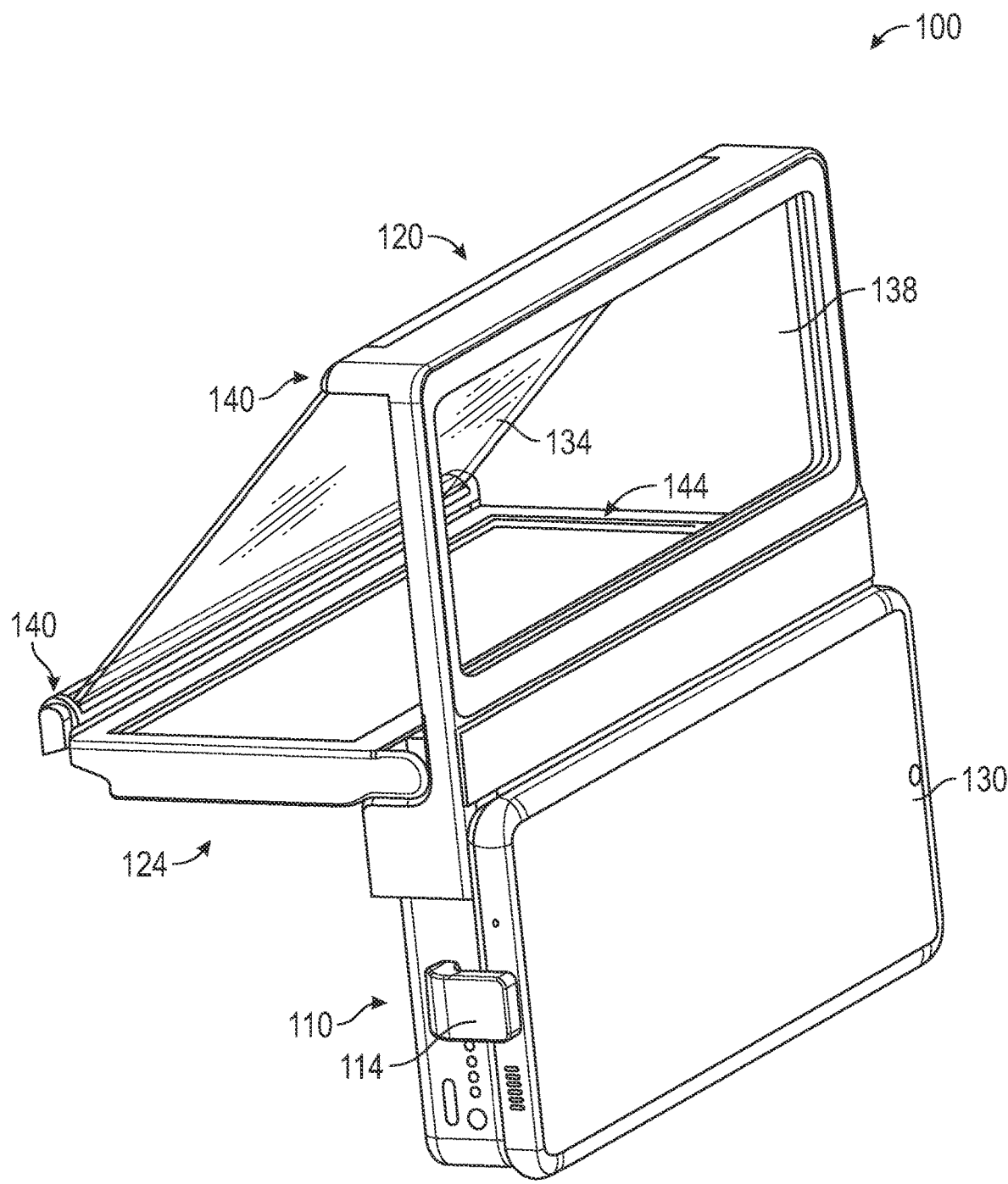
FIG. 1 is a front angled isometric view of an external power bank case and holographic projection accessory with a mobile phone inserted, in accordance with a first embodiment.
Figure 2:
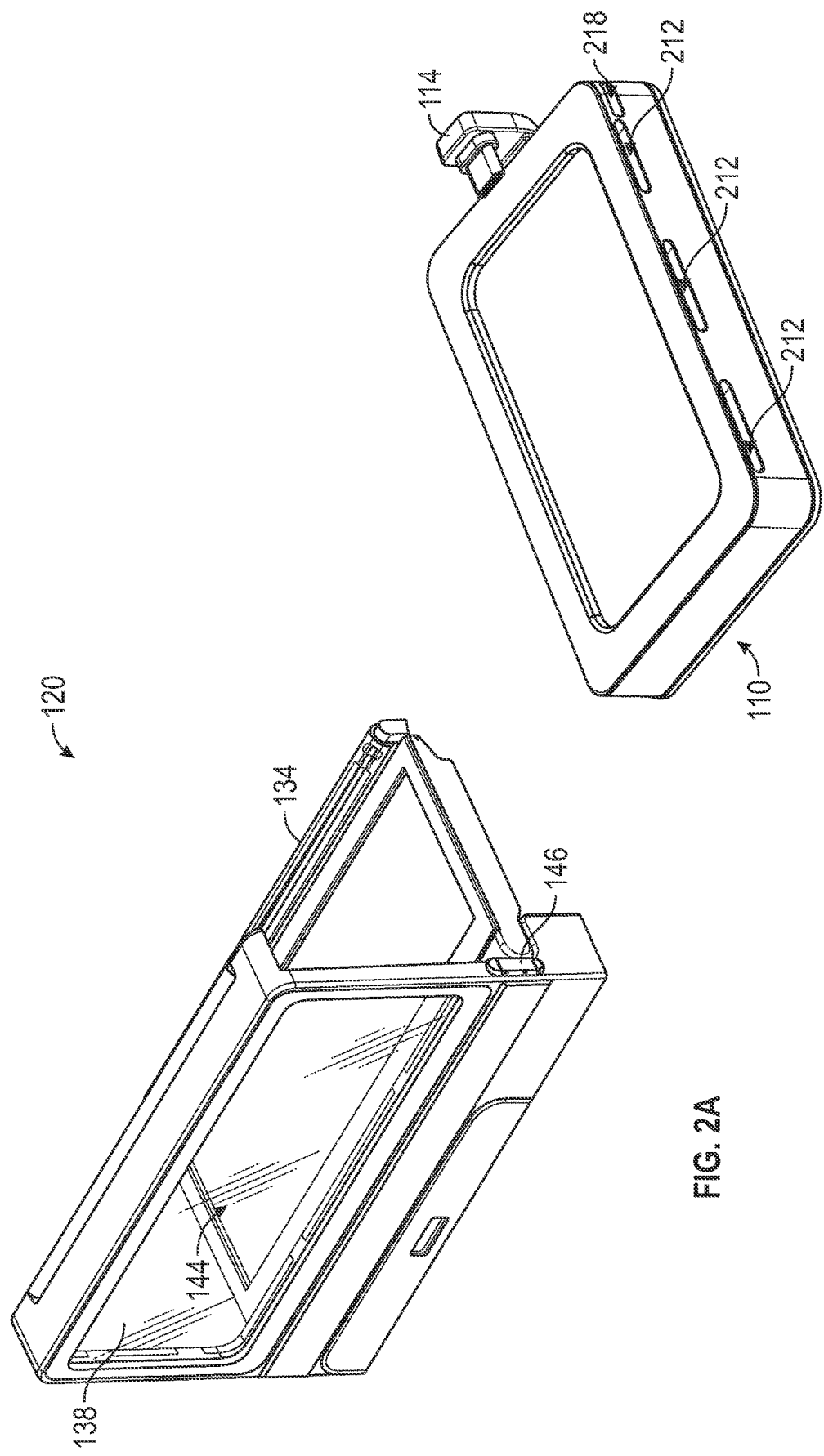
FIG. 2A is a front angled isometric view of a holographic projection unit included within the accessory of FIG. 1 when detached from the external power bank case and configured in an open state.
FIG. 2B is a front perspective view of the external power bank case included within the accessory of FIG. 1.

FIGS. 1-2 illustrate an external power bank case and holographic projection accessory 100, in accordance with a first embodiment. The accessory 100 includes an external power bank case 110 and a holographic projection unit 120 detachable from the external power bank case 110. The accessory 100 is intended for use with a portable electronic device, such as a mobile phone 130. In one embodiment the external power bank case 110 may attach to the mobile phone 130 or other device via a magnetic connection facilitated by a mounting plate adhesively secured to a rear surface of the phone 130. When connected to the mobile phone 130 the external power bank case 110 effectively acts as a phone case replacement. The external power bank case 110 may incorporate ports and interfaces, such as electrical plug element 114 and electrical receptacle 218, for providing power to the mobile phone and to the holographic screen assembly 120. As shown, the external power bank case 110 includes receiving slots 212 for receiving complementary insertion tabs of the holographic projection unit 120. During operation of the accessory 100, the external power bank case 110 receives video and other data from the mobile phone 130 and in one embodiment functions essentially as a pass-through to provide the video data to the holographic screen assembly 120.

The holographic projection unit 120 is configured for holographically rendering a video signal provided by the mobile phone 130 or other portable electronic device. The video signal may be received from the mobile phone 130 either wirelessly or after being relayed to the projection unit 120 by the external power bank case 110. The holographic projection unit 120 provides a compact and conveniently portable rendering environment capable of collapsing and being carried with ease when detached from the external power bank case 110. When attached to the external power bank case 110, the holographic projection unit 120 may be opened from a collapsed state to an open state suitable for reflective viewing by a lens-slide hinge system 140 described in further detail below. The holographic projection unit 120 may also be powered on in response to actuation of a power switch disposed on the external power bank case 110.

The holographic projection unit 120 may include a casing structure 124, foil or transparent reflective surface 134, touch screen 138, and a projector 144. The projector 144 may be comprised of a Liquid Crystal Display (LCD) screen, Organic Light-Emitting Diode (OLED) screen, image projector or other type of image projection device. The holographic projection unit 120 is preferably designed with collapsible hinges, thereby permitting the holographic view-field to be compressed into a convenient, user-friendly size, and subsequently reopened. The projection unit 120 may have a user-selectable switch 146 included within a switch release mechanism operative to deploy the transparent reflective surface 134 and projector 144 from a closed position to an open position.

The video signal provided by the mobile phone 130 can be sent to the external power bank case 110, for relay to the holographic projection unit 120, via the standard electronic signal input port per device, Universal Serial Bus (USB), USB-C, Lightning connector, HDMI, and translated by the accessory 100 into a holographic projection.

The touch screen 138 provides users with touch control, which when sent back to the operating system of the mobile device 130 via the external power bank case 110, allows for control of the holographically projected environment. In one implementation the foil or transparent reflective surface 134 is a holofoil screen comprised of a transparent reflector such as Gorilla glass or the equivalent, with a high-refractive index polymer overlay. The holofoil screen 134 will typically be similar or identical in size as the projector 144 (e.g., LCD screen).

During operation the holographic projection unit 120 is placed in an open state and receives, either wirelessly or via the external power bank case, video or other data input from the mobile phone 130 or other portable device and projects this input into a holographic display field. When the holographic display field is combined with information elements created by Augmented Reality (AR) software, a holographic AR projection is created. This allows a user to perceive a holographic environment or object placed in the environment surrounding the user's mobile phone 130. The holographic projection unit 120 is configured with the capability to accept user input, such as through the touch screen 138, which is disposed within or proximate the holographic display field. This allows for a multiplicity of high-level programming and user input functions to be received by the holographic projection unit 120 and to be provided by the accessory to the a user's mobile phone 130. During operation of the holographic projection unit 120 the transparent reflective surface 134 is used to project a holographic viewing field, which creates a holographic effect above the viewing space of the mobile phone 130 or other electronic device.

As noted above, when placed in the open state the holographic projection unit 120 is configured to generate holographic images based upon the video signal or other image information provided by the mobile phone 130. When placed in the closed or collapsed state, the holographic projection unit 120 assumes a generally planar form. In one embodiment the holographic projection unit 120 may transition to the collapsed state from the open state either while attached to the external power bank case 110 or after being detached from it.

The touch screen 138 is disposed within or proximate the holographic display field of the holographic projection unit 120 and provides the capability to accept user input. This allows for a multiplicity of high-level programming and user input functions to be received by the holographic projection unit 120 and to be provided by the accessory 100 to the a user's mobile phone 130.

Figure 3:
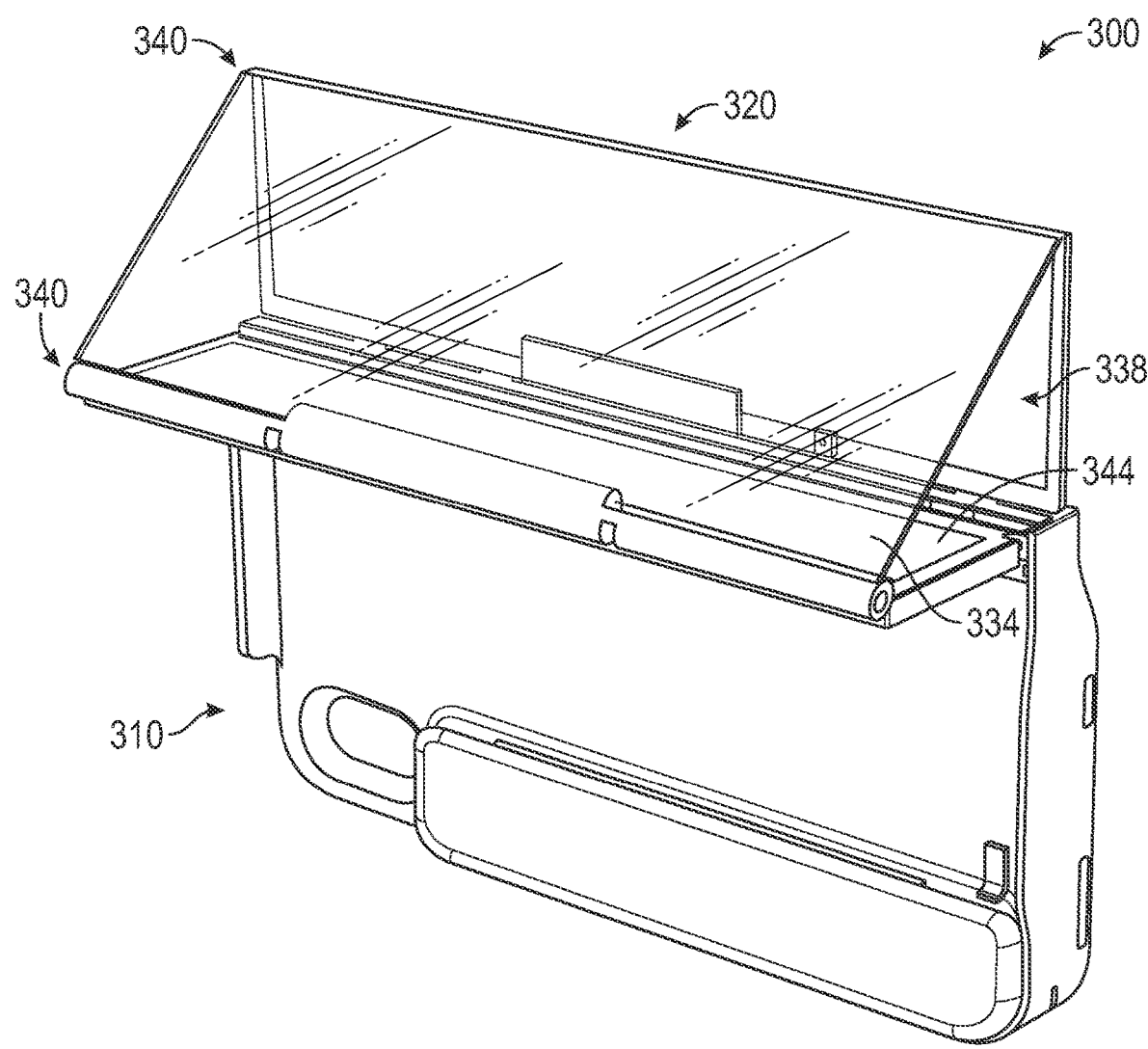
FIG. 3 is a rear angled isometric view of the external power bank case and holographic projection accessory, in accordance with a second embodiment.

FIG. 3 is a rear angled isometric view of an external power bank case and holographic projection accessory 300, in accordance with a second embodiment. The accessory 300 includes an external power bank case 310 and a holographic projection unit 320 detachable from the external power bank case 310. The accessory 300 is intended for use with a portable electronic device, such as a mobile phone (not shown). In one embodiment the external power bank case 310 may attach to the mobile phone or other device via a magnetic connection facilitated by a mounting plate adhesively secured to a rear surface of the phone 330. When connected to the mobile phone the external power bank case 310 effectively acts as a phone case replacement. The external power bank case 310 may incorporate ports and interfaces for providing power to the mobile phone and to the holographic screen assembly 320. During operation of the accessory 300, the external power bank case 310 receives video and other data from the mobile phone and in one embodiment functions essentially as a pass-through to provide the video data to the holographic screen assembly 320. When attached to the external power bank case 310, the holographic projection unit 320 may be opened from a collapsed state to an open state suitable for reflective viewing by a lens-slide hinge system 340.

The holographic projection unit 320 may include a foil or transparent reflective surface 334, touch screen 338, and a projector 344. The projector 144 may be comprised of a Liquid Crystal Display (LCD) screen, Organic Light-Emitting Diode (OLED) screen, image projector or other type of image projection device. In one implementation the foil or transparent reflective surface 334 is a holofoil screen comprised of a transparent reflector such as Gorilla glass or the equivalent, with a high-refractive index polymer overlay. The holofoil screen 334 will typically be similar or identical in size as the projector 344 (e.g., LCD screen).

Figure 4:
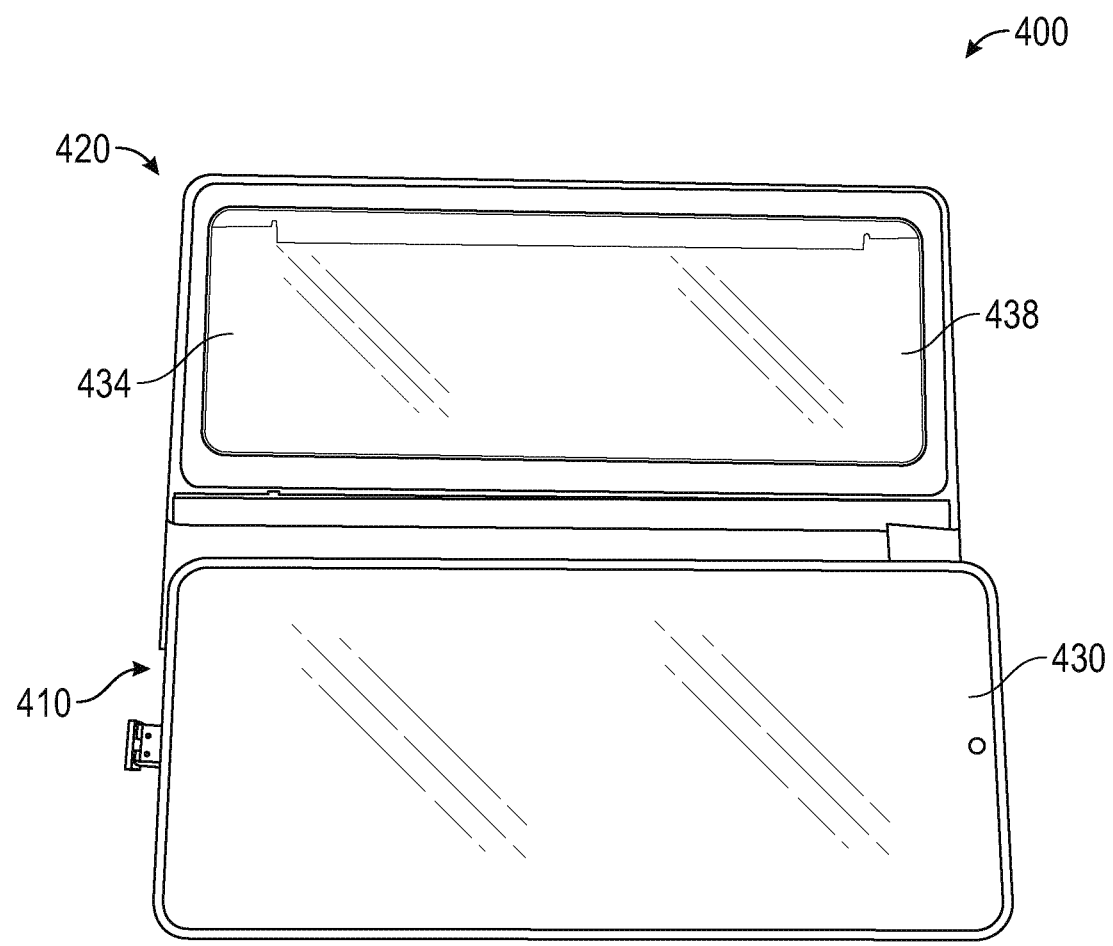
FIG. 4 is a front view of an external power bank case and holographic projection accessory with a mobile phone inserted, in accordance with a third embodiment.
Figure 5:
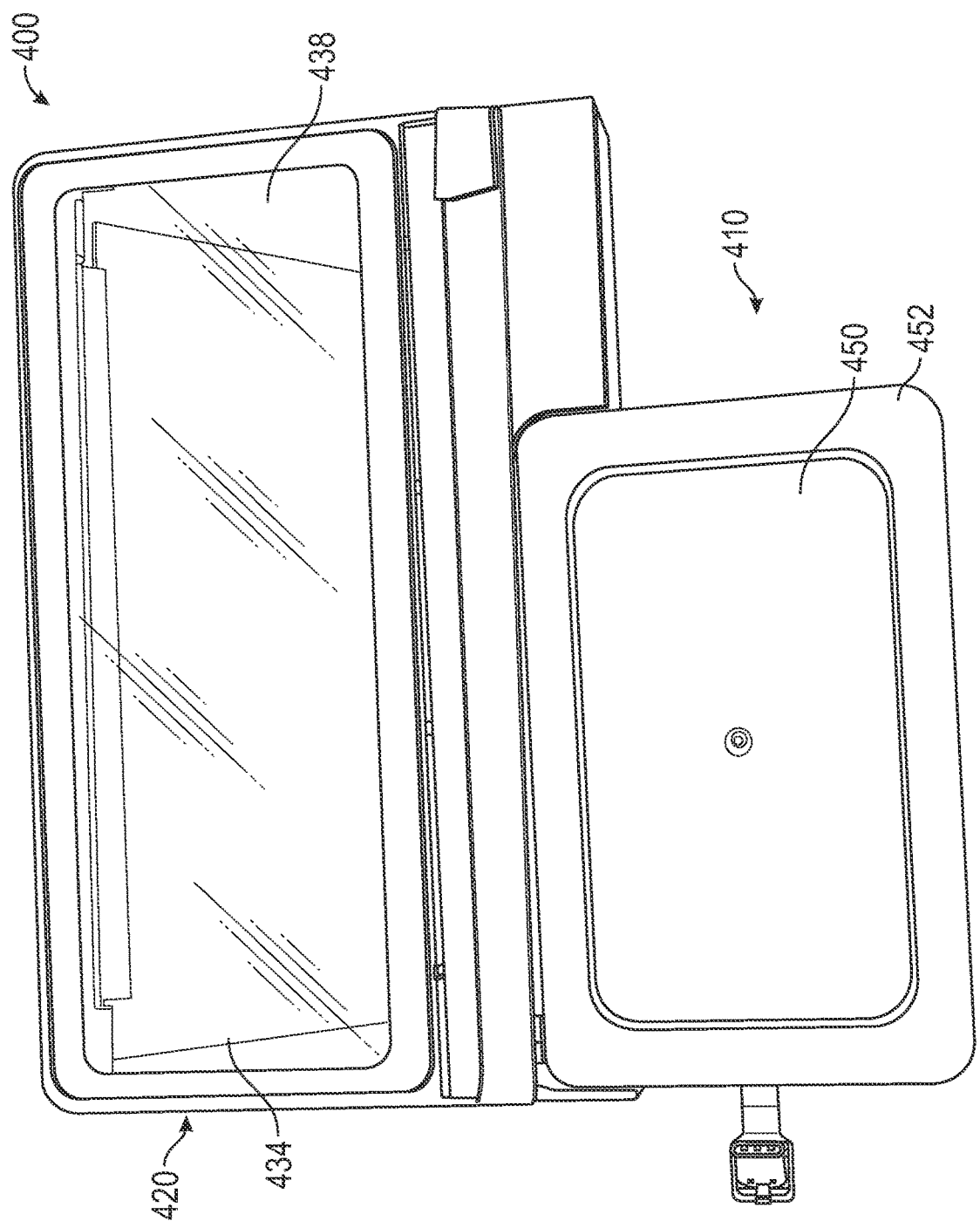
FIG. 5 is a front view of the external power bank case and holographic projection accessory of FIG. 4, without a mobile phone inserted.

Attentions is now directed to FIGS. 4-10, which depict an external power bank case and holographic projection accessory 400 in accordance with a third embodiment. FIG. 4 is a front view of the external power bank case and holographic projection accessory 400 with a mobile phone 430 inserted. FIG. 5 depicts the accessory 400 without a mobile phone inserted.

The accessory 400 includes an external power bank case 410 and a holographic projection unit 420 detachable from the external power bank case 410. The accessory 400 is intended for use with a portable electronic device, such as a mobile phone 430. In one embodiment the external power bank case 410 may attach to the mobile phone 430 or other device via a magnetic connection facilitated by a mounting plate adhesively secured to a rear surface of the phone 430. The mounting plate is received by a rectangular mounting bed 450 in the form of a depression in a front side 452 of the external power bank case 410. The external power bank case 410 may incorporate ports and interfaces, such as electrical plug element 414 and electrical receptacle 418, for providing power to the mobile phone 430 and to the holographic projection unit 420. As shown, the external power bank case 410 includes receiving slots 412 (FIG. 9) for receiving complementary insertion tabs of the holographic projection unit 420.

The holographic projection unit 420 may include a foil or transparent reflective surface 434, touch screen 438, and a projector 444. The projector 444 may be comprised of a Liquid Crystal Display (LCD) screen, Organic Light-Emitting Diode (OLED) screen, image projector or other type of image projection device. The touch screen 436 may be mechanically supported by a frame structure 460 integral with, or coupled to, a base connector 462 of the accessory 400. In one implementation the foil or transparent reflective surface 434 is a holofoil screen comprised of a transparent reflector such as Gorilla glass or the equivalent, with a high-refractive index polymer overlay. The holofoil screen 434 will typically be similar or identical in size as the projector 444 (e.g., LCD screen). The holographic projection unit 420 may further include a rectangular LED arrangement 458 positioned beneath a bottom edge of the touch screen. The LED arrangement 458 may be driven to provide illumination of varying color and/or intensity in order to, for example, complement the content of the holographic projection or provide status information to a user.

Figure 6:
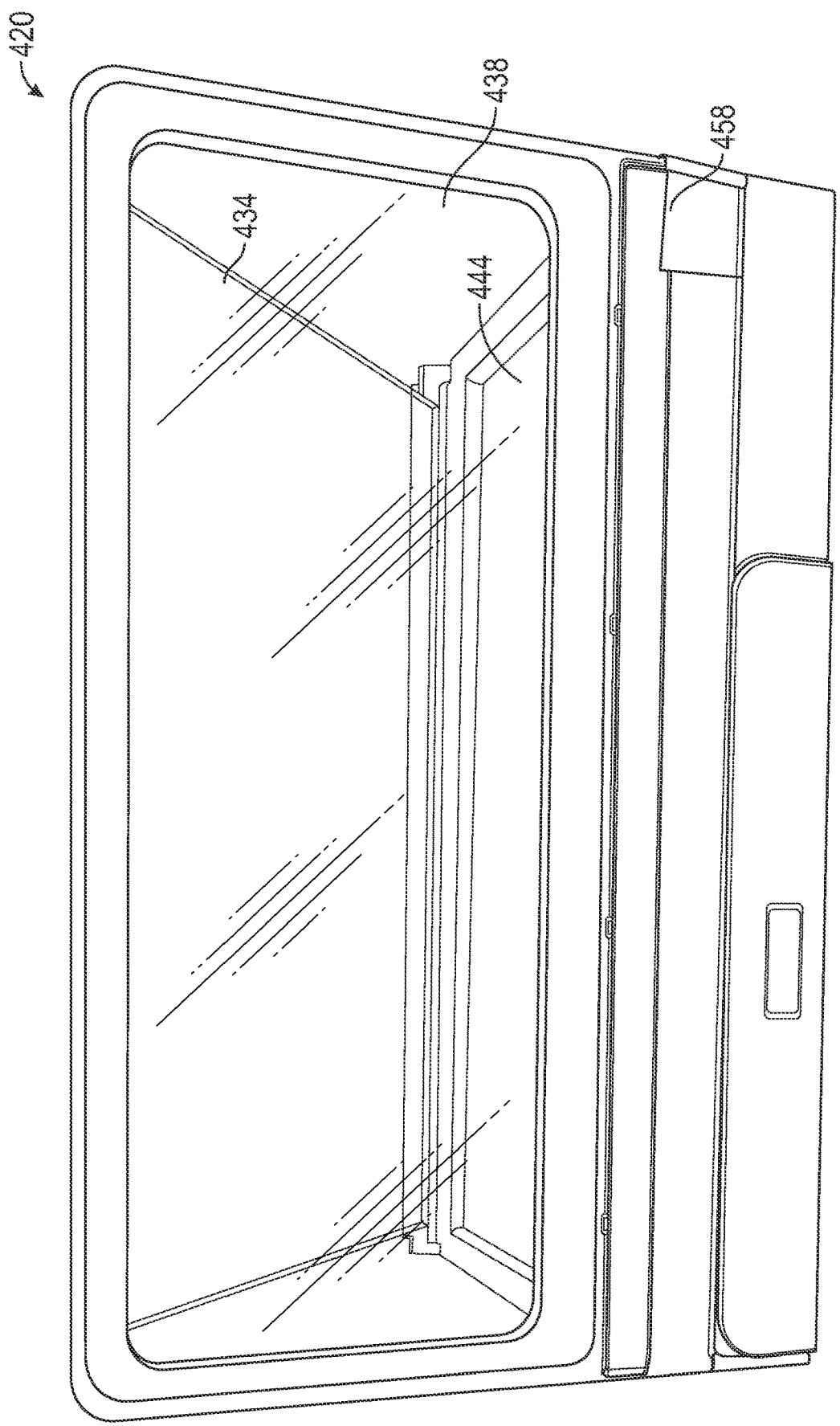
FIG. 6 is a front view of the holographic projection unit of FIG. 4 when detached from an external power bank case and configured in an open state.

FIG. 6 is a front view of the holographic projection unit 420 when detached from the external power bank case 410 and configured in an open state.

Figure 7:
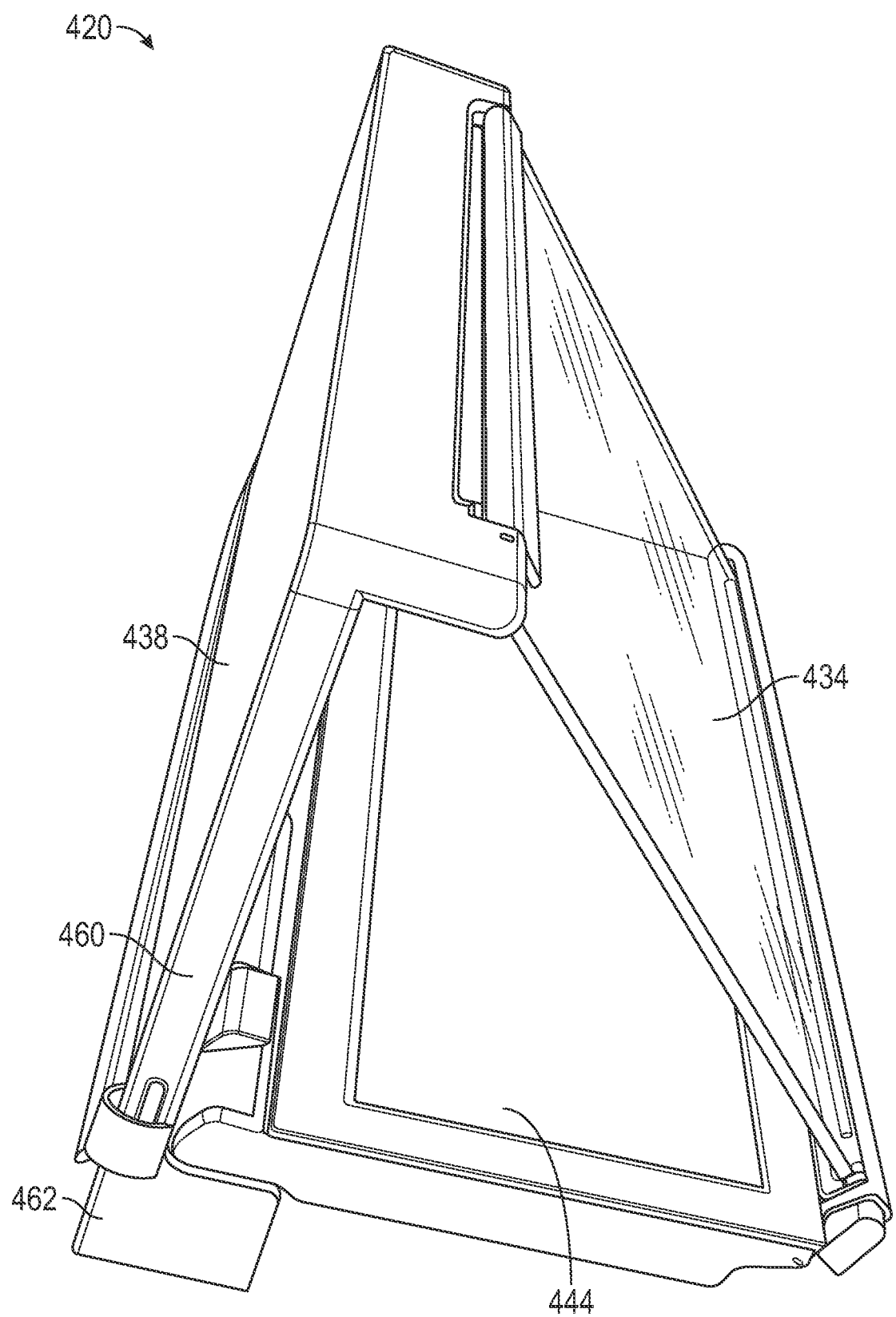
FIG. 7 is a side view of the holographic projection unit of FIG. 4 when detached from an external power bank case and configured in an open state.

FIG. 7 is a side view of the holographic projection unit 420 when detached from the external power bank case 410 and configured in an open state.

Figure 8:
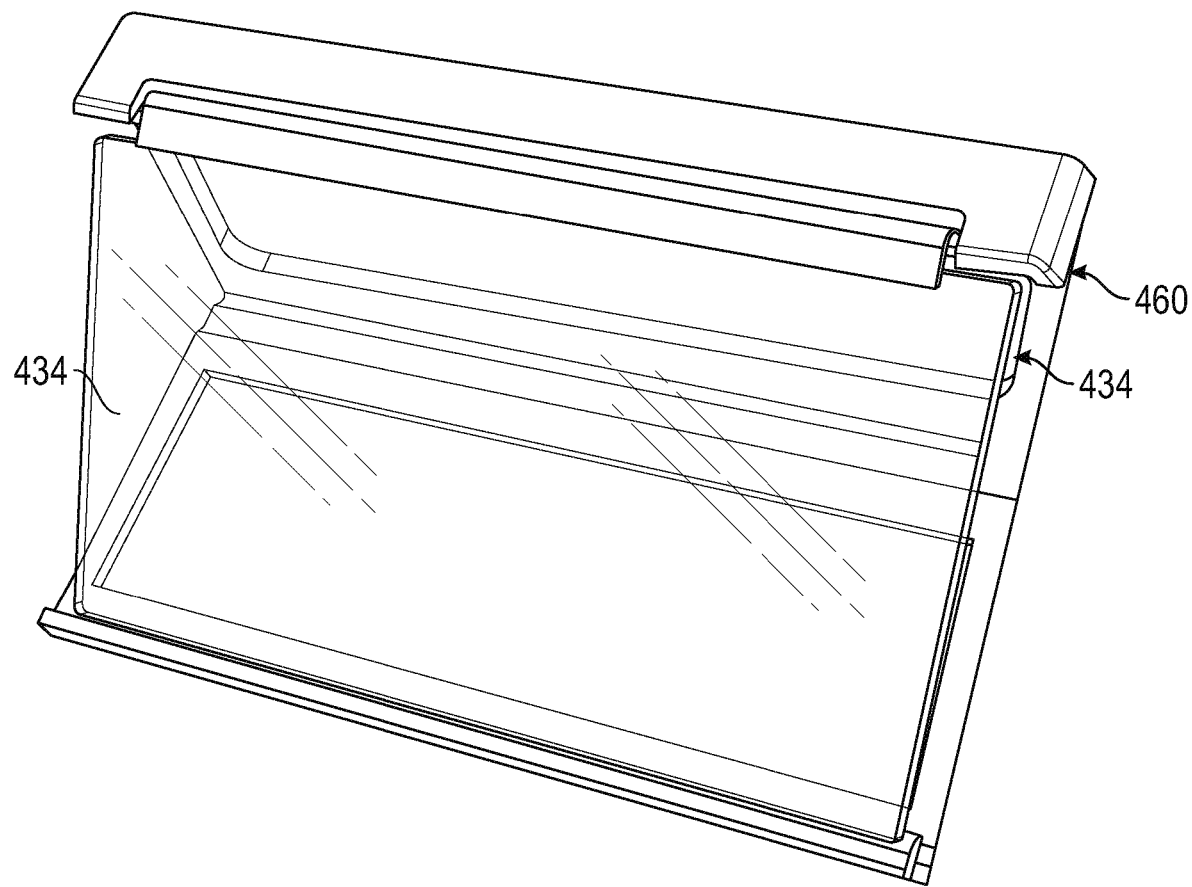
FIG. 8 is a top rear view of the holographic projection unit of FIG. 4 when detached from an external power bank case and configured in an open state.

FIG. 8 is a top rear view of the holographic projection unit 420 when detached from the external power bank case 410 and configured in an open state.

Figure 9A:
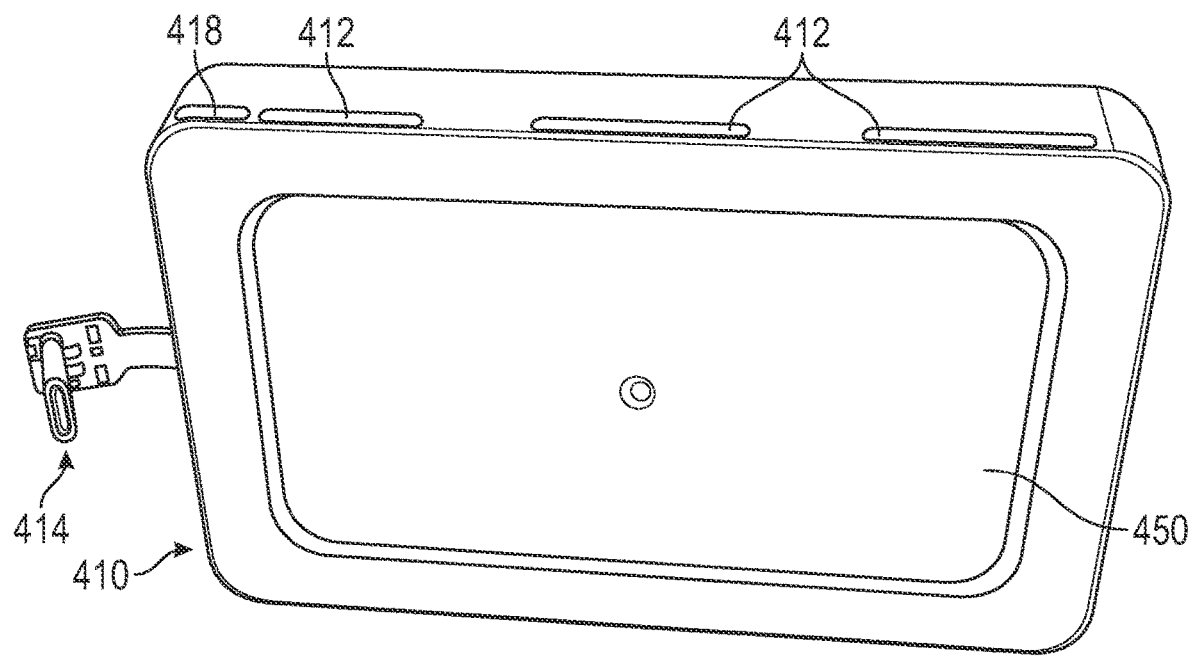
FIG. 9A is a front perspective view of an external battery pack.

FIG. 9A is a front perspective view of the external power bank case 410.

Figure 9B:
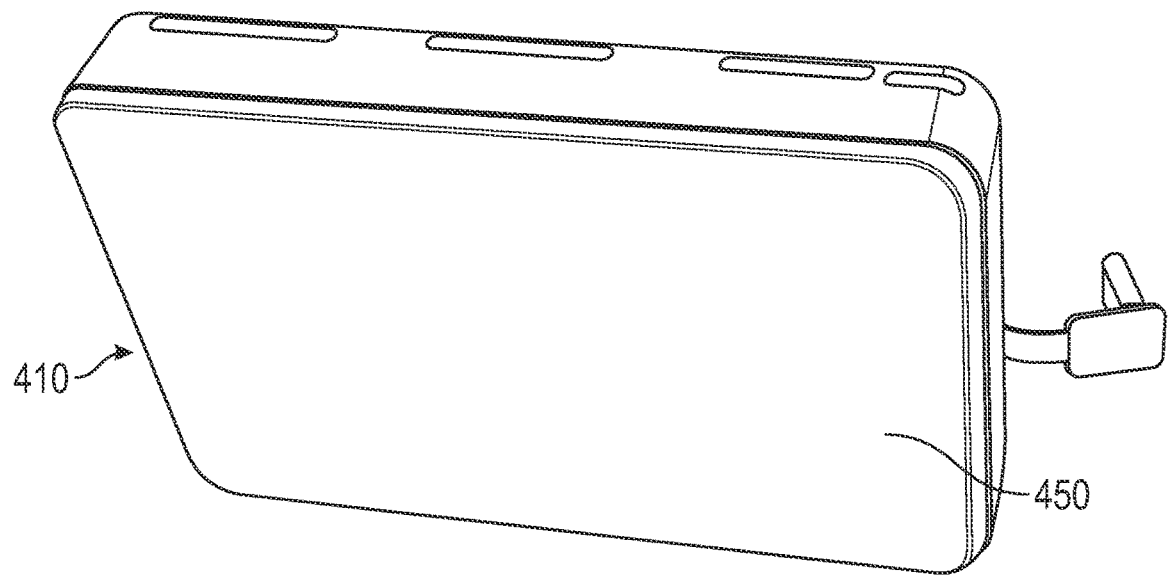
FIG. 9B is a back perspective view of the external battery pack of FIG. 9.

FIG. 9B is a back perspective view of the external battery pack case 410.

Figure 10:
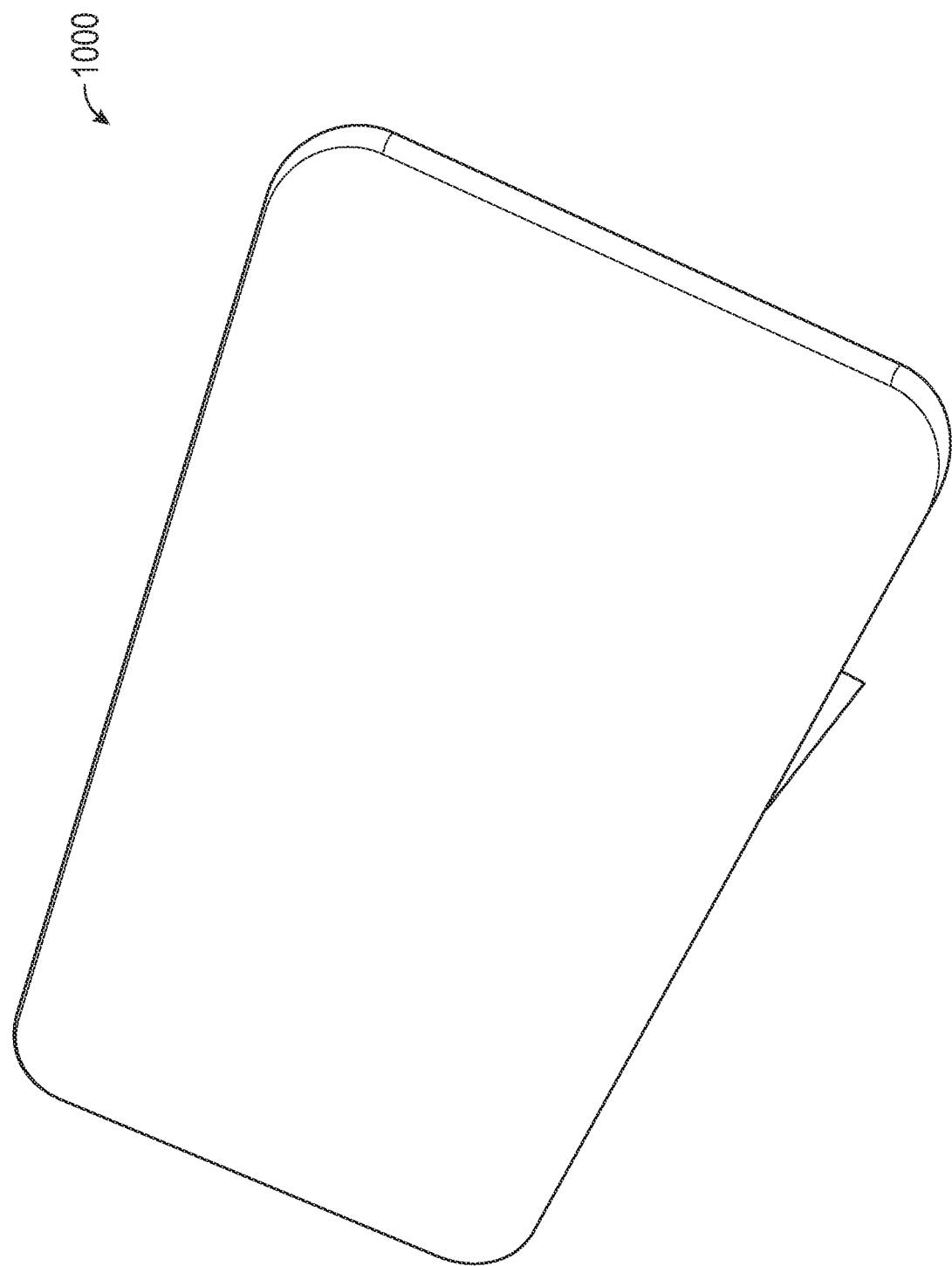
FIG. 10 is a front perspective view of a phone mounting plate designed for use with the external battery pack of FIG. 9.

FIG. 10 is a front perspective view of a phone mounting 1000 plate designed for use with the external battery pack case 410.

Figure 11:
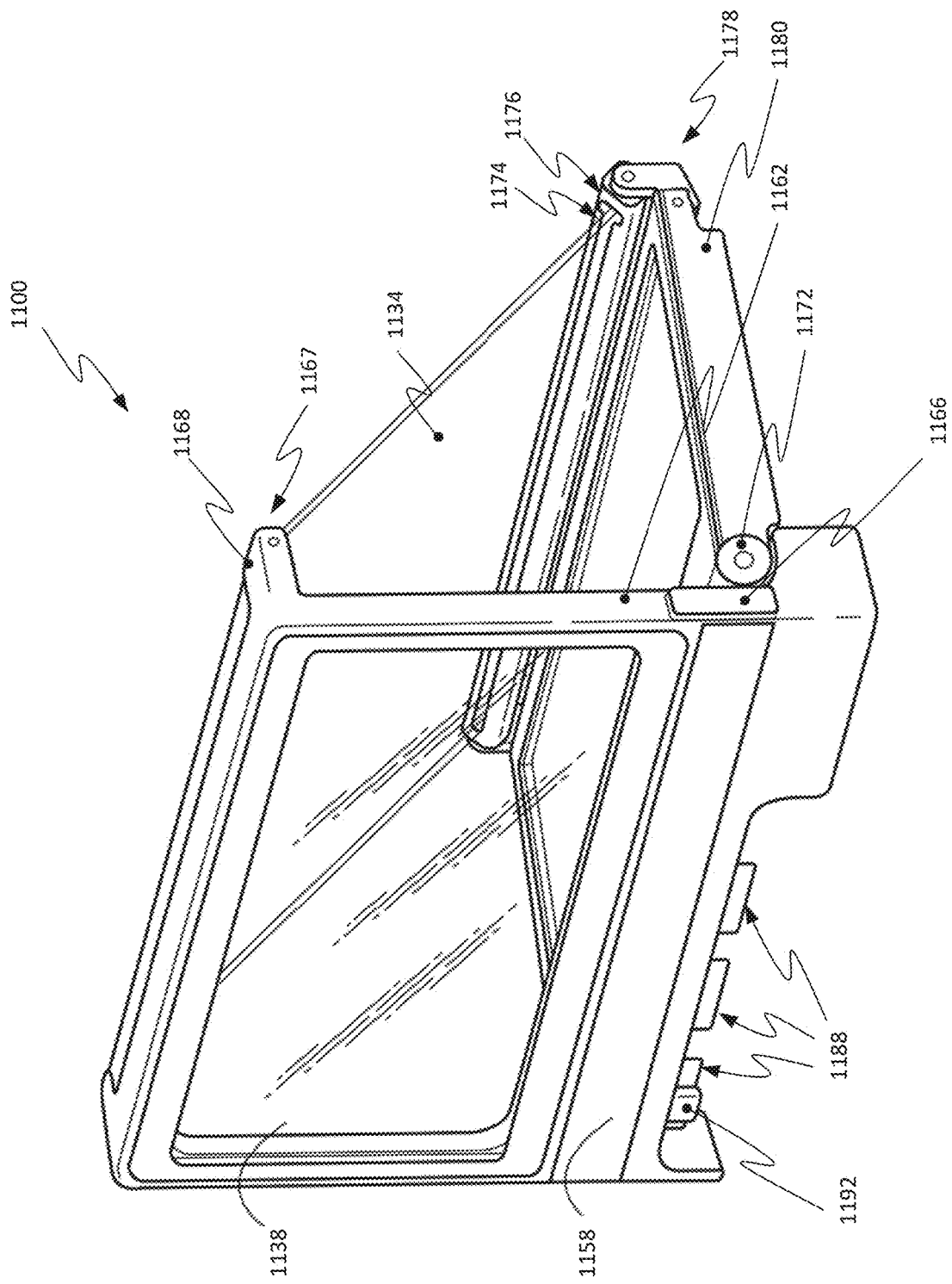
FIG. 11 is a front angled isometric view of a holographic projection unit when detached from an external power bank case and configured in an open state, in accordance with a fourth embodiment.
Figure 12:
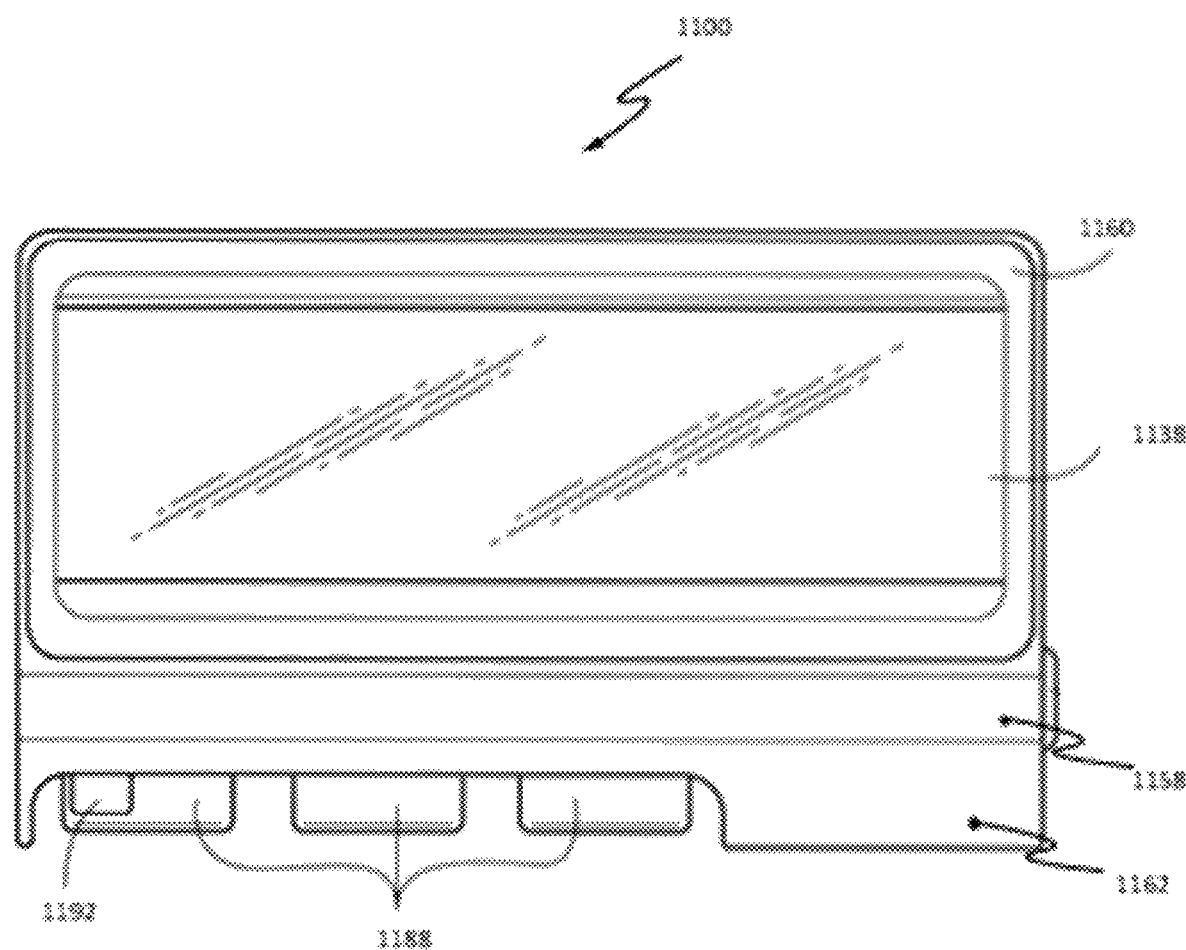
FIG. 12 is a front view of the holographic projection unit of FIG. 11, in a collapsed state.
Figure 13:
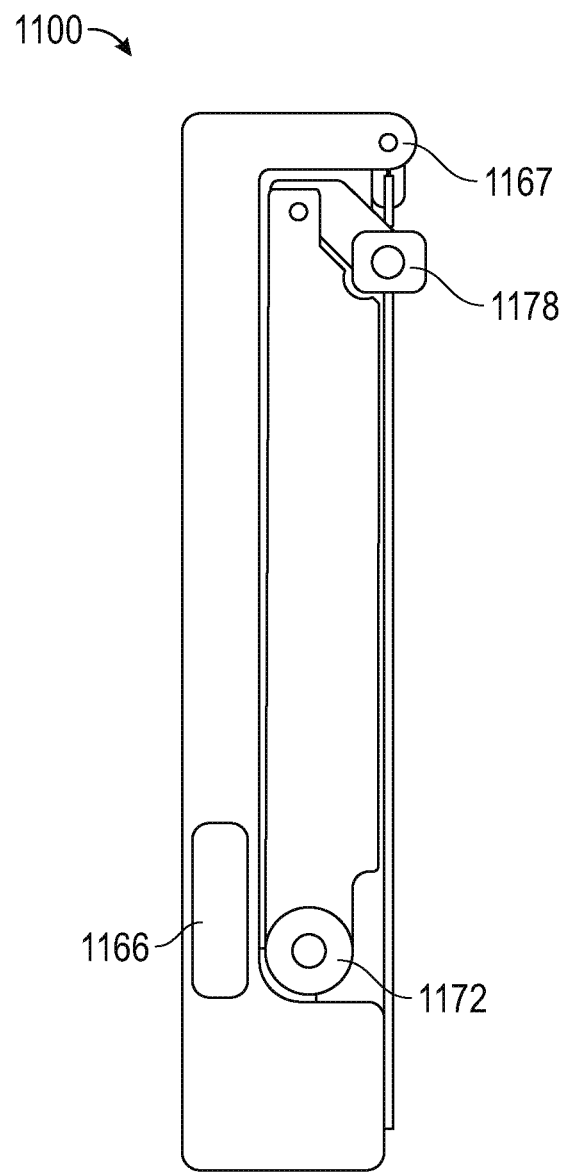
FIG. 13 is a right-side view of the holographic projection unit of FIG. 11, in a collapsed state.
Figure 14:
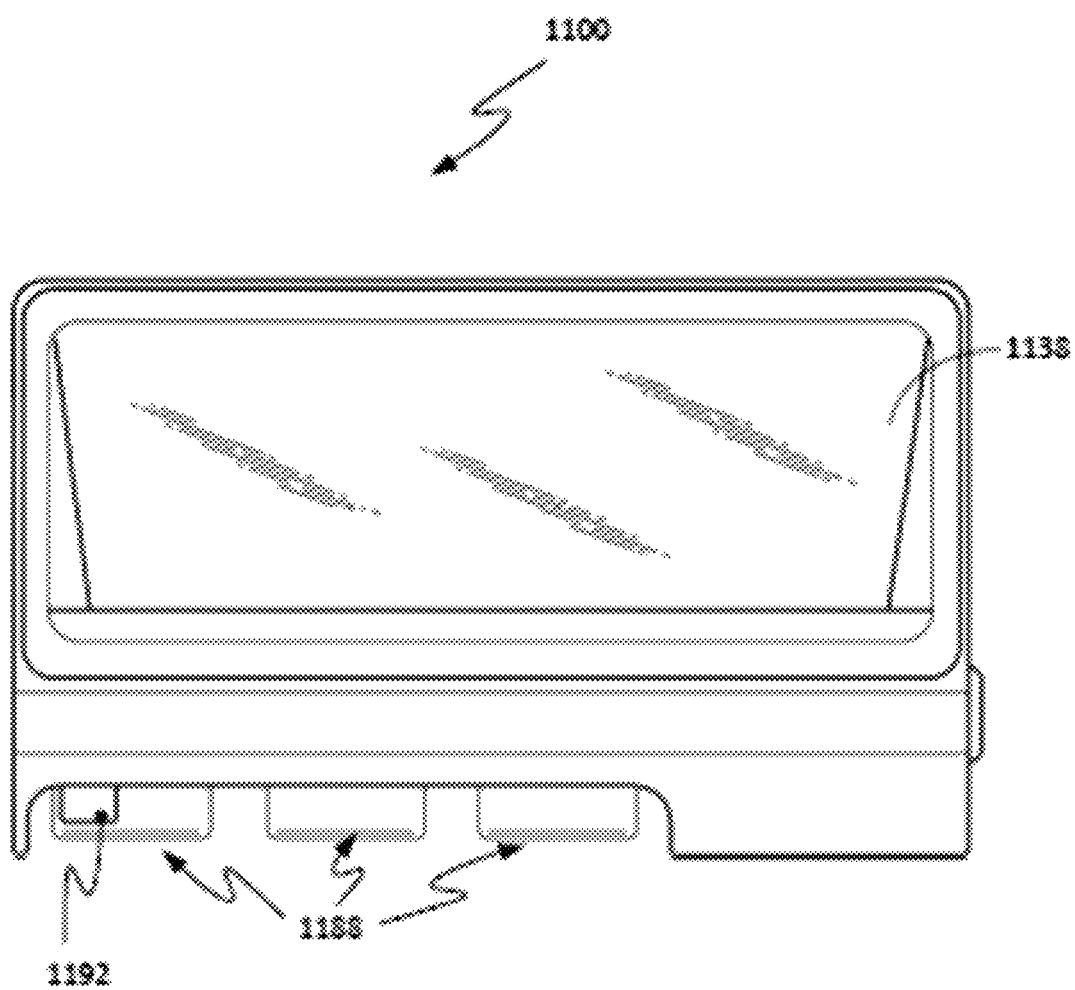
FIG. 14 is a front view of the holographic projection unit of FIG. 11, in an open state.
Figure 15:
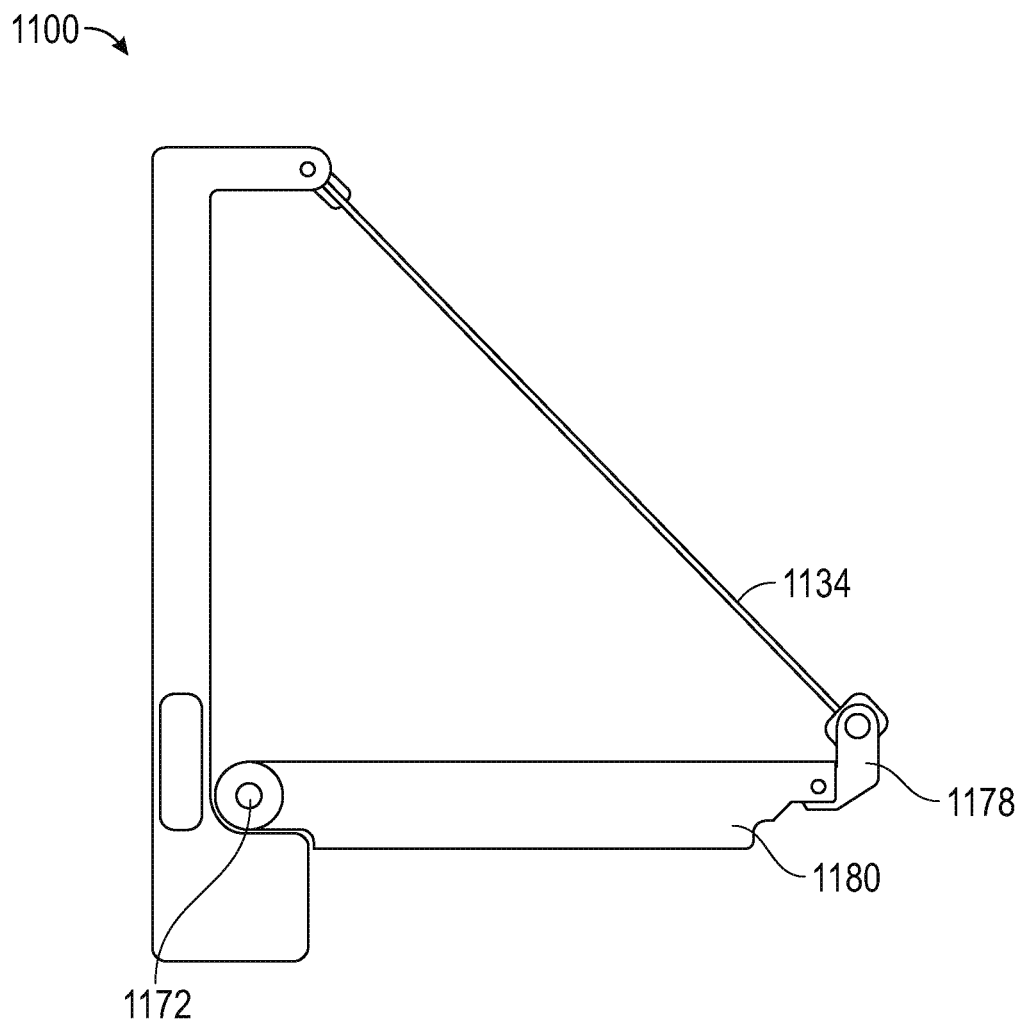
FIG. 15 is a right-side view of the holographic projection unit of FIG. 11, in an open state.
Figure 16:
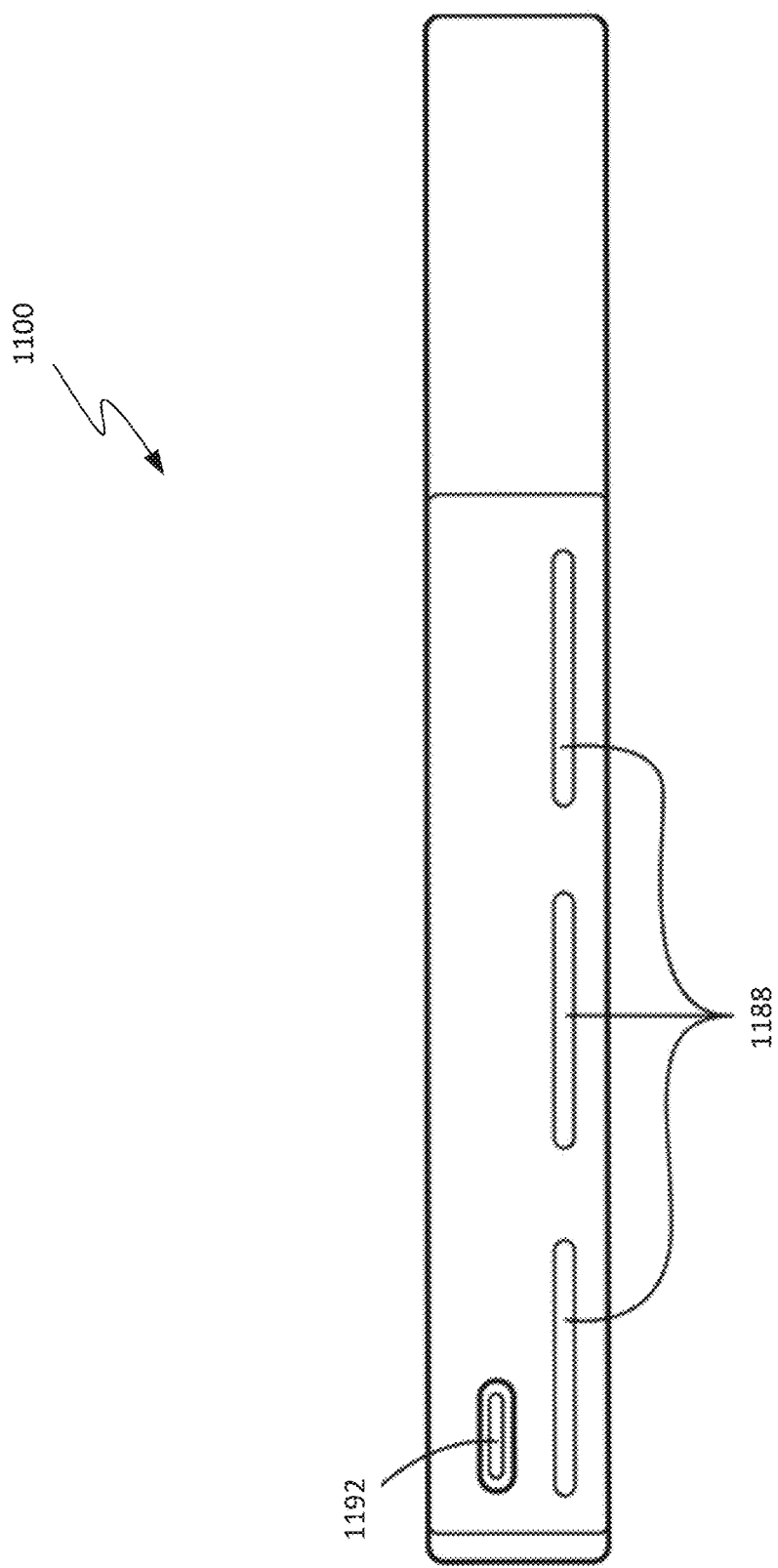
FIG. 16 is a bottom view of the holographic projection unit of FIG. 11 in a closed position, depicting both connection ports and supporting columns.

Attention is now directed FIGS. 11-17, which illustrate an embodiment of a holographic projection unit 1100. FIG. 11 is a front angled isometric view of the holographic projection unit 1100 when detached from an external power bank case and configured in an open state. In addition to being attachable to an external power bank case disposed to be magnetically attached to a mobile phone, the holographic projection unit may also operate as an independent holographic projection device when provided with power and input video signal information through other means.

The holographic projection unit 1100 may include a foil or transparent reflective surface 1134, touch screen 1138, and a projector 1144. The projector 1144 may be comprised of a Liquid Crystal Display (LCD) screen, Organic Light-Emitting Diode (OLED) screen, image projector or other type of image projection device. The touch screen 1136 may be mechanically supported by a frame structure 1160 integral with, or coupled to, a base connector 1162 of the accessory 1100. In one implementation the foil or transparent reflective surface 1134 is a holofoil screen comprised of a transparent reflector such as Gorilla glass or the equivalent, with a high-refractive index polymer overlay. The holofoil screen 1134 will typically be similar or identical in size as the projector 1144 (e.g., LCD screen). The holographic projection unit 1100 may further include a rectangular LED arrangement 1158 positioned beneath a bottom edge of the touch screen. The LED arrangement 1158 may be driven to provide illumination of varying color and/or intensity in order to, for example, complement the content of the holographic projection or provide status information to a user.

A user-selectable switch 1166 is disposed on the frame structure 1160 and is included within a switch release mechanism operative to deploy the transparent reflective surface 1134 and projector 1144 from a closed position to an open position. A first hinge element 1167 is supported by a top frame member 1168 which extends rearward from a top of the touch screen frame structure 1160 and which is generally perpendicular to a plane of the touch screen 1138. The first end of the holofoil screen 1134 is attached to the first hinge element 1167 and is movable between a closed or collapsed position in which it is substantially parallel to the touch screen 1138 and an open position in which it is disposed at approximately a 45 degree angle relative to the plane of the touch screen 1138. In the collapsed state the LCD projector is substantially parallel to, and interposed between, the touch screen 1138 and the holofoil screen 1134.

A bottom of the LCD projector housing is connected to a second hinge element 1172 abutting a bottom of the touch screen frame structure 1160. By rotating at the second hinge element 1172 the LCD projector 1144 may move between the closed or collapsed position and an open position in which the LCD projector 1144 is at an angle of approximately 90 degrees relative to the touch screen 1138. In the open position a top of the LCD projector 1144 housing forms an angle of approximately 45 degrees with the holofoil screen 1134. When transitioning between the open and collapsed states, the holofoil 1134 slides through a slot 1174 defined in a foil positioning member 1176 coupled to a dual hinge element 1178 affixed to the top of the LCD projector housing 1180.

In one embodiment the user-selectable switch 1166 implements a tension clasp that applies a forward pressure on the transparent reflective surface 1134, locking it in place in a closed position. The switch 166 is spring loaded so that, upon a user pulling the clasp open, the transparent reflective surface 1134 and projector 1144 will fold open and when released the clasp will return to its closed position.

The holographic projection unit 1100 may include insertion tabs 1188 disposed to be received by complementary receiving slots of an external power bank case so as to mechanically couple the projection unit 1100 to the external power bank case. The unit 1100 further includes an electrical plug element 1192, such as a USB-C plug, disposed to be received by a corresponding receptacle of an external power bank in order to facilitate the transfer of power and data (e.g., video data) from the power bank to the projection unit 1100.

Figure 17:
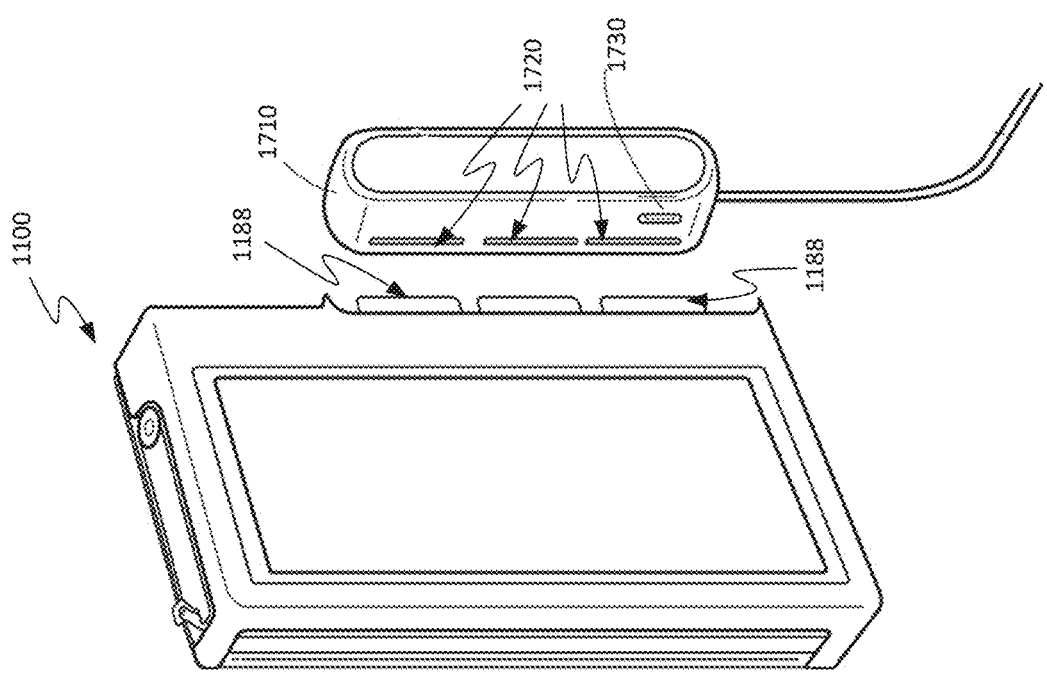
FIG. 17 is an angled isometric view of the holographic projection unit of FIG. 11 in a collapsed state and as disposed to be attached to a tertiary connection adapter.

FIG. 17 depicts the holographic projection unit 1100 in a closed position as it would appear with a tertiary connection adapter 1710, which may be mechanically connected to the projection unit when insertion tabs 1188 of the unit 1100 are inserted into corresponding receiving slots 1720 of the connection adapter 1710. The adapter 1710 may further include an electrical receptacle 1730, such as a USB-C receptacle, configured to connect with electrical plug element 1192 and thereby facilitate the passing of a video signal and power to the projection unit 1100.

Figures 18A, 18B:
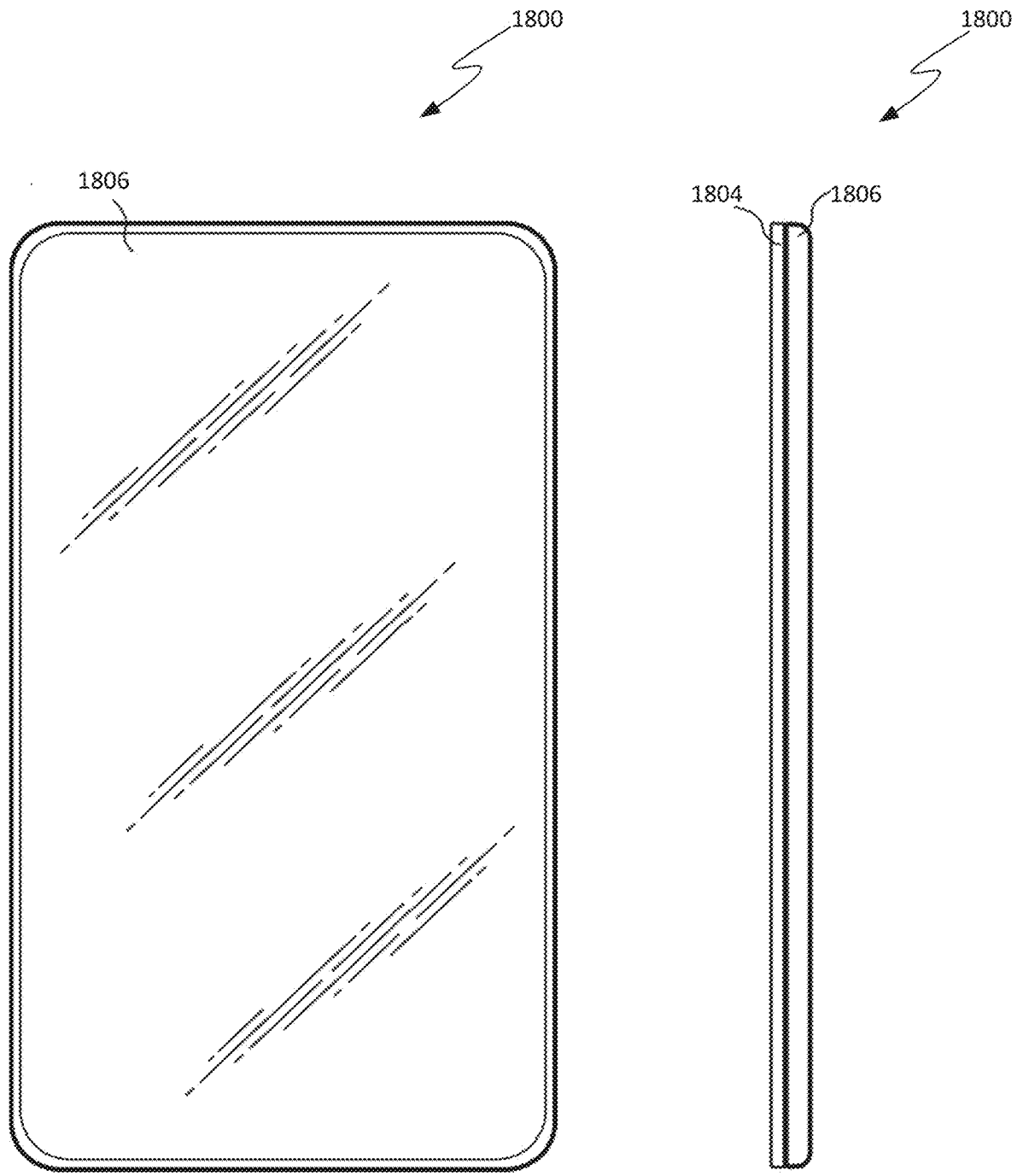
FIG. 18A is a front view of a mounting plate including an adhesive layer for securing the plate to a mobile phone so to enable magnetic attachment of the mobile phone to the external power bank case included in the embodiment of FIG. 11, the power bank case defining a recess dimensioned to receive the mounting plate.
FIG. 18B is a side view of a mounting plate of FIG. 18A.
Figure 18C:
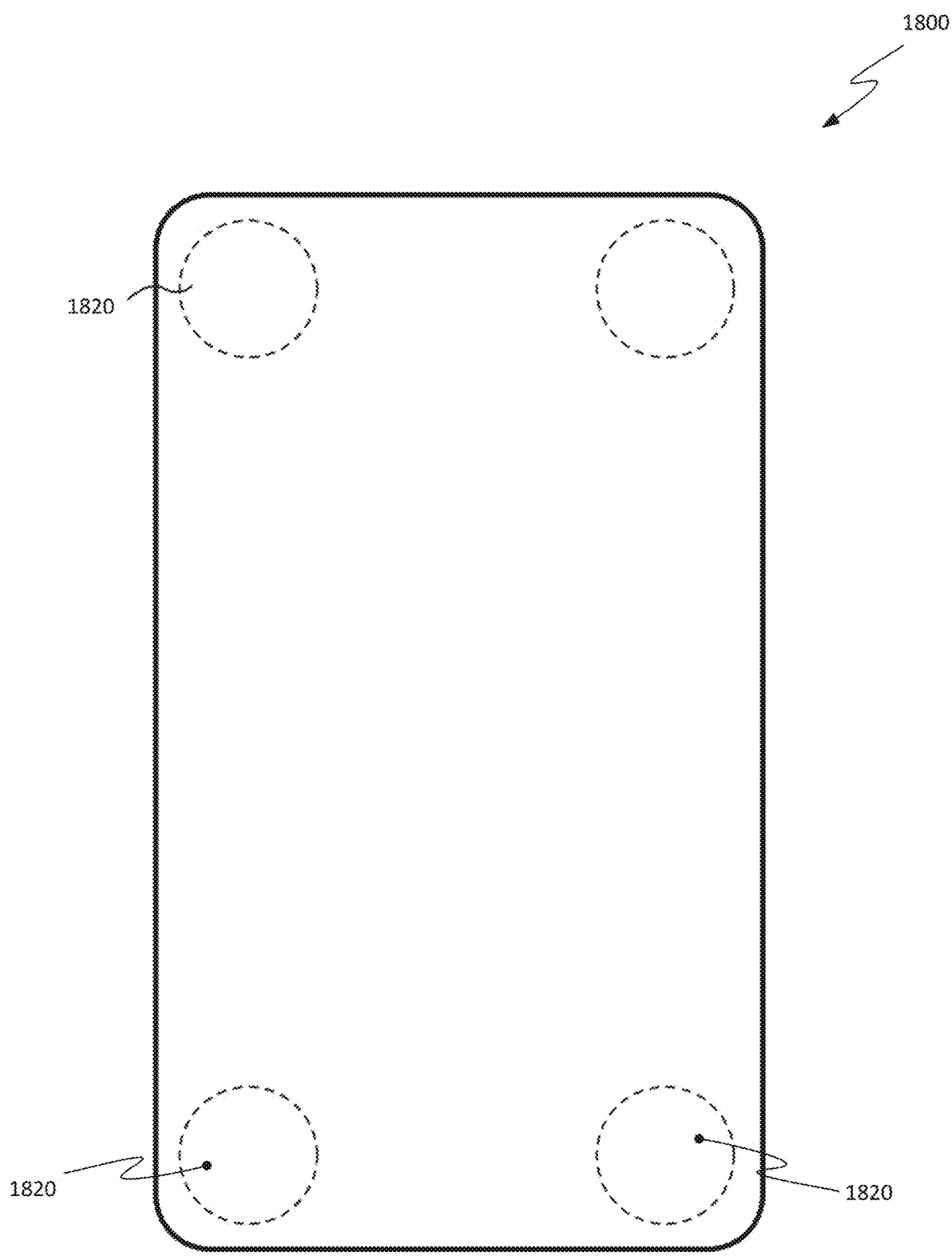
FIG. 18C is a partially transparent front view of the mounting plate of FIG. 16A.
Figure 19A:
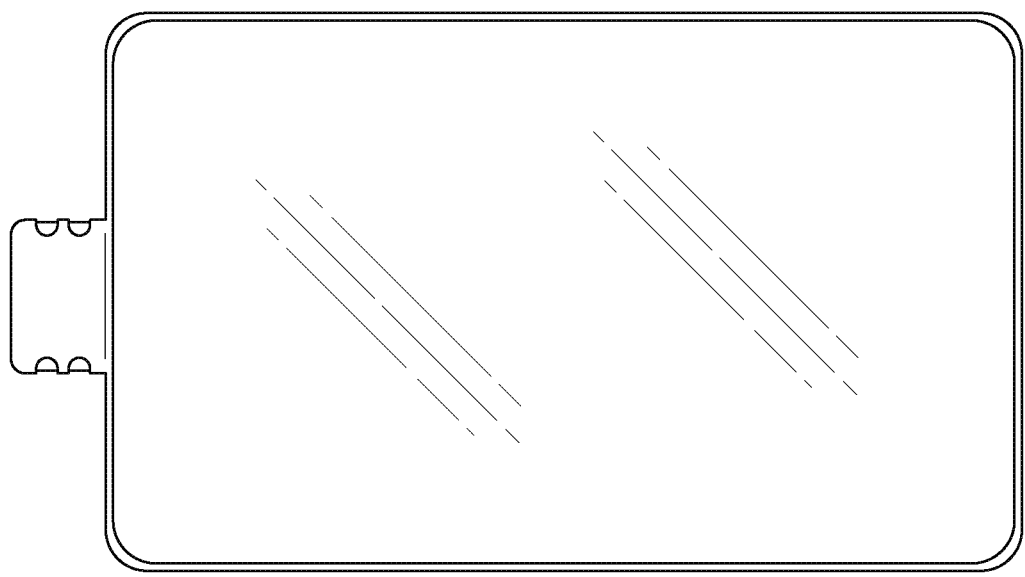
FIG. 19A is a back view of the external power bank case included within the embodiment of FIG. 11.

Attention is now directed to FIGS. 18-20, which illustrate a mounting plate 1800 and a power bank 1800 including a power bank case 1802. The mounting plate 1800 is disposed to be affixed to a mobile phone 1806 and thereafter received by a recess defined by a power bank case 1802. The mounting plate 1800 includes an adhesive layer 1804 and a body portion 1806. The adhesive layer 1804 secures the plate 1800 to the mobile phone 1806 so to enable magnetic attachment of the mobile phone 1806 to the external power bank case 1802. The power bank case 1802 defines a recess 1810 dimensioned to receive the mounting plate 1800. In one embodiment the mounting plate 1800 incudes a set of magnets 1820 arranged to align with corresponding magnets 1822 disposed within the recess 1810.

The power bank case may be configured with electrical receptacles 1840, 1850, such as USB-C receptacles, for facilitating the transfer of power and video signals to a holographic display assembly. A neck element 1830 functions to attach an electrical plug element 1840, such as a USB-C plug, to the power bank case 1802.

Figure 20B:
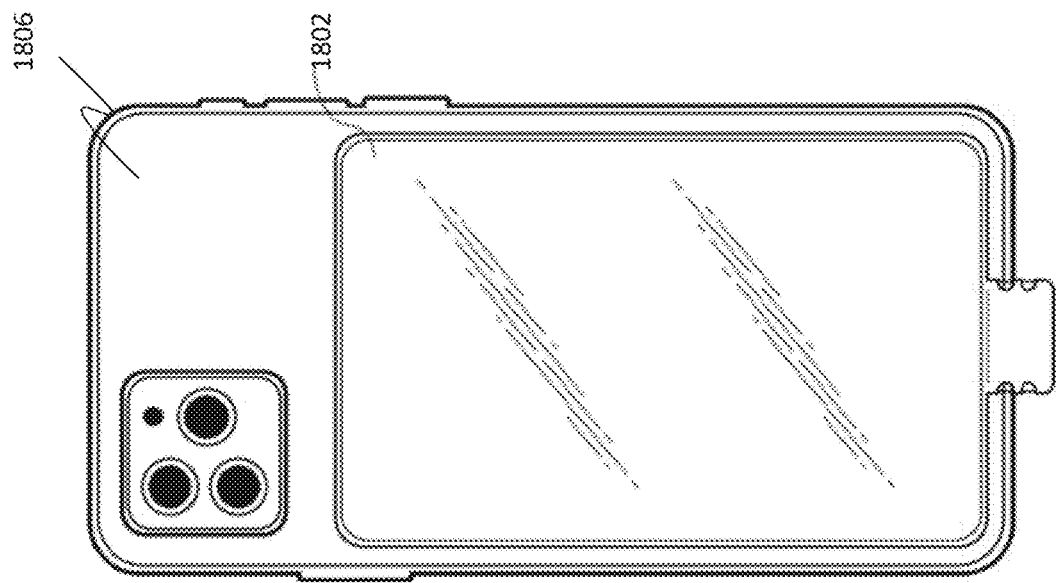
FIG. 20B depicts the external power bank case of FIGS. 19A-19D after being magnetically connected to the mounting plate of FIG. 18A and thereby removably attached to the mobile phone.
Figure 20A:
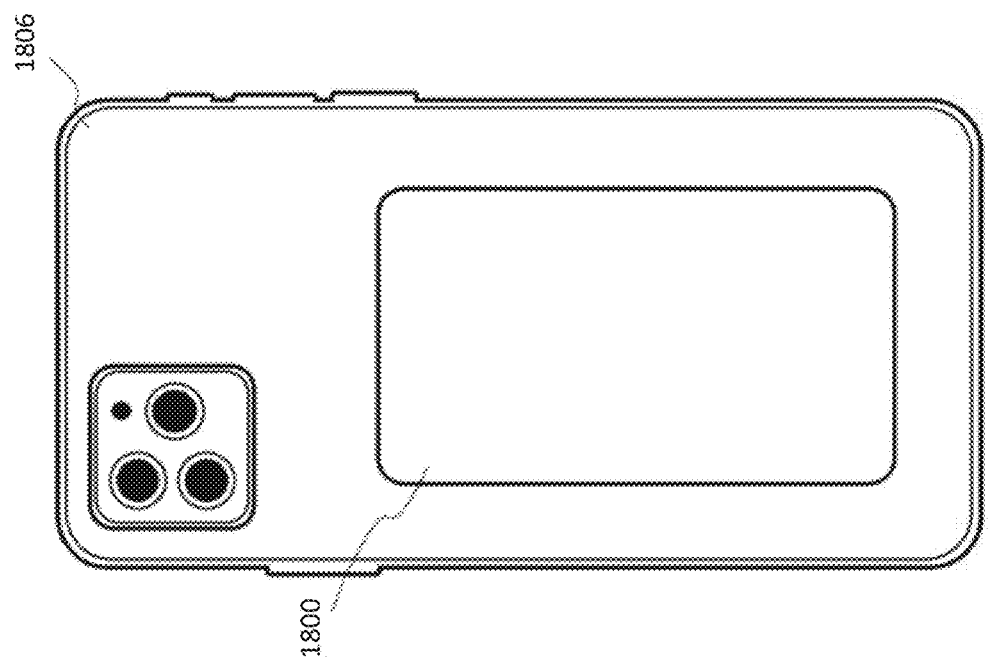
FIG. 20A depicts the mounting plate of FIG. 18, as adhesively secured to a mobile phone.

FIG. 20A depicts the mounting plate 1800, as adhesively secured to a mobile phone 1806.

FIG. 20B depicts the external power bank case 1802 after being magnetically connected to the mounting plate of 1800 and thereby removably attached to the mobile phone 1806.

In one embodiment the foil or transparent reflective surface 434, 1134 is of a size commensurate with the size of the screen of the holographic projector. The transparent reflective surface 434, 1134 may be implemented using, for example, Gorilla glass or an equivalent, with a high-refractive index polymer overlay. The polymer may be produced with horizontal polarization, and/or 1-8% general tinting. Although the optical parameters of the transparent reflective surface 434, 1134 may vary among different implementations of the projection, in some embodiments the thickness of the surface 434, 1134 may be approximately 0.7 mm with a coating of approximately 0.3 mm coating. The hinge mechanism of the projector allows for robust use while also allowing the user to remove the foil or transparent reflective surface upon breakage or for cleaning and/or replacement.

Figure 21B:
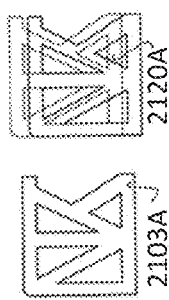
FIG. 21B illustrates the resulting image visible to a viewer's eyes post-reflection on the surface of the standard transparent reflector of FIG. 21A.
Figure 21A:
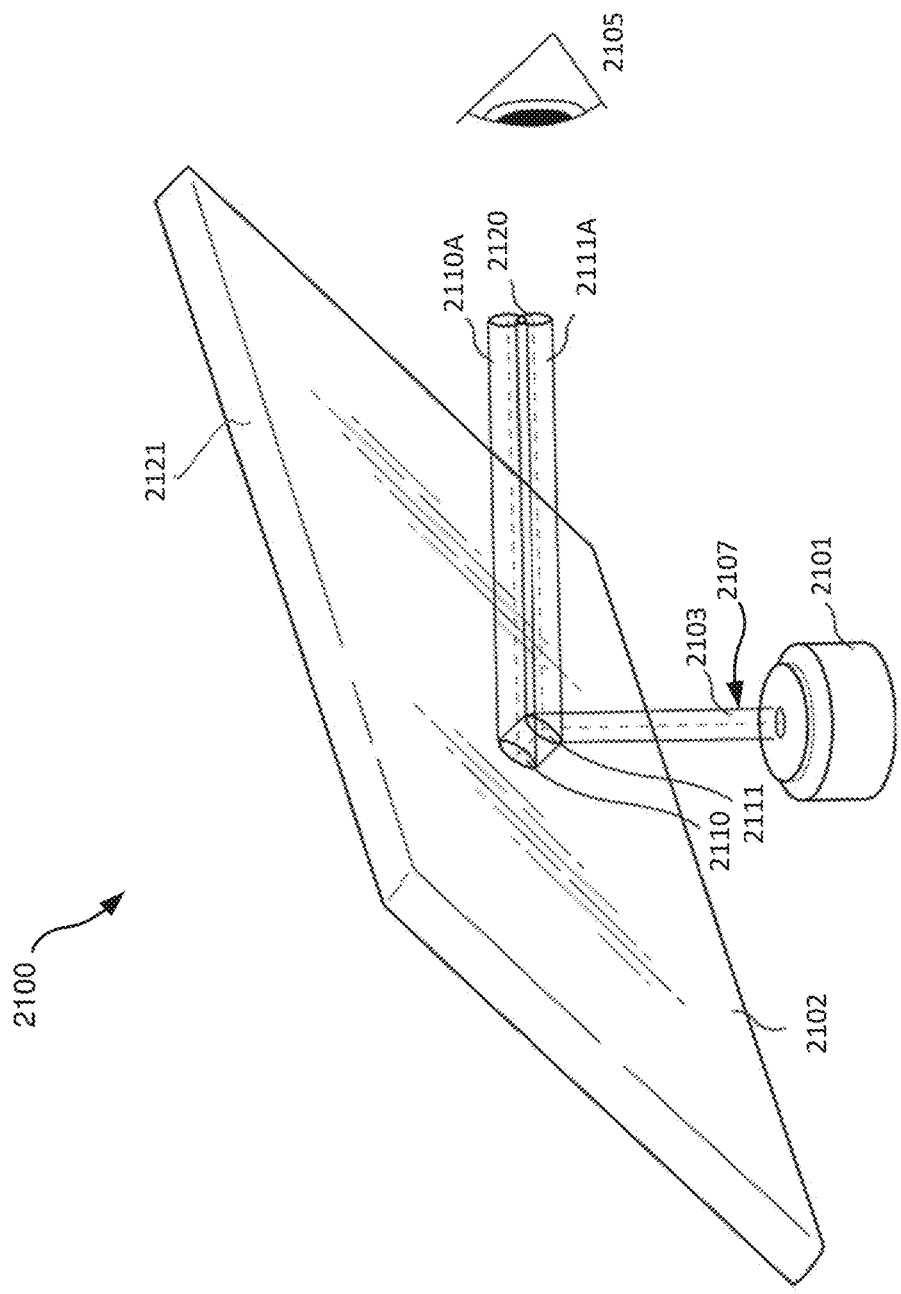
FIG. 21A illustrates a perspective view of a conventional image projection system including a standard transparent reflector material.

FIGS. 22-25 provide a description of a particular multi-layer implementation of the foil or transparent reflective surface 434, 1134. Before turning to FIGS. 22-25, reference is first made to FIG. 21A, which illustrates a perspective view of a conventional image projection system 2100 including a standard transparent reflector material 2121 used commonly in reflective displays to reflect a visible beam of light 2112 at a predetermined reflection angle. In the standard model of FIG. 21A, an image projector 2101 projects the beam of light 2107, which carries an image 2103, onto a front surface 2102 of the reflector material 2121 arranged at a predefined angle relative to a viewer 2105 and a direction of the beam 2107. As shown in FIG. 21B, this results in a reflection of the image 2103 being visible to the viewer 2105 on the transparent reflector material 2121. As the thickness of the reflector material 2121 increases, dual, or double-reflections occur. The image 2103 contacts both the front plane surface 2102, creating projected image 2111A, and the back plane 2110, causing projected image 2110A. As shown in FIG. 21B, the result of the creation of projected image 2111A and projected image 2110A is a composite image 2120A. Thus, rather than viewing intended visible image 2103A, the viewer 2105 perceives the composite image 2120A, which is likely to cause confusion in view of the lack of alignment of the projected images 2110A, 2111A.

Figure 22B:
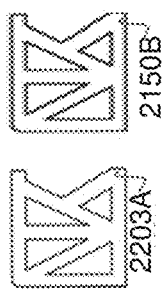
FIG. 22B illustrates the resulting image visible to a viewer's eyes post-reflection on the micro-layered reflector structure depicted in 22A.
Figure 22A:
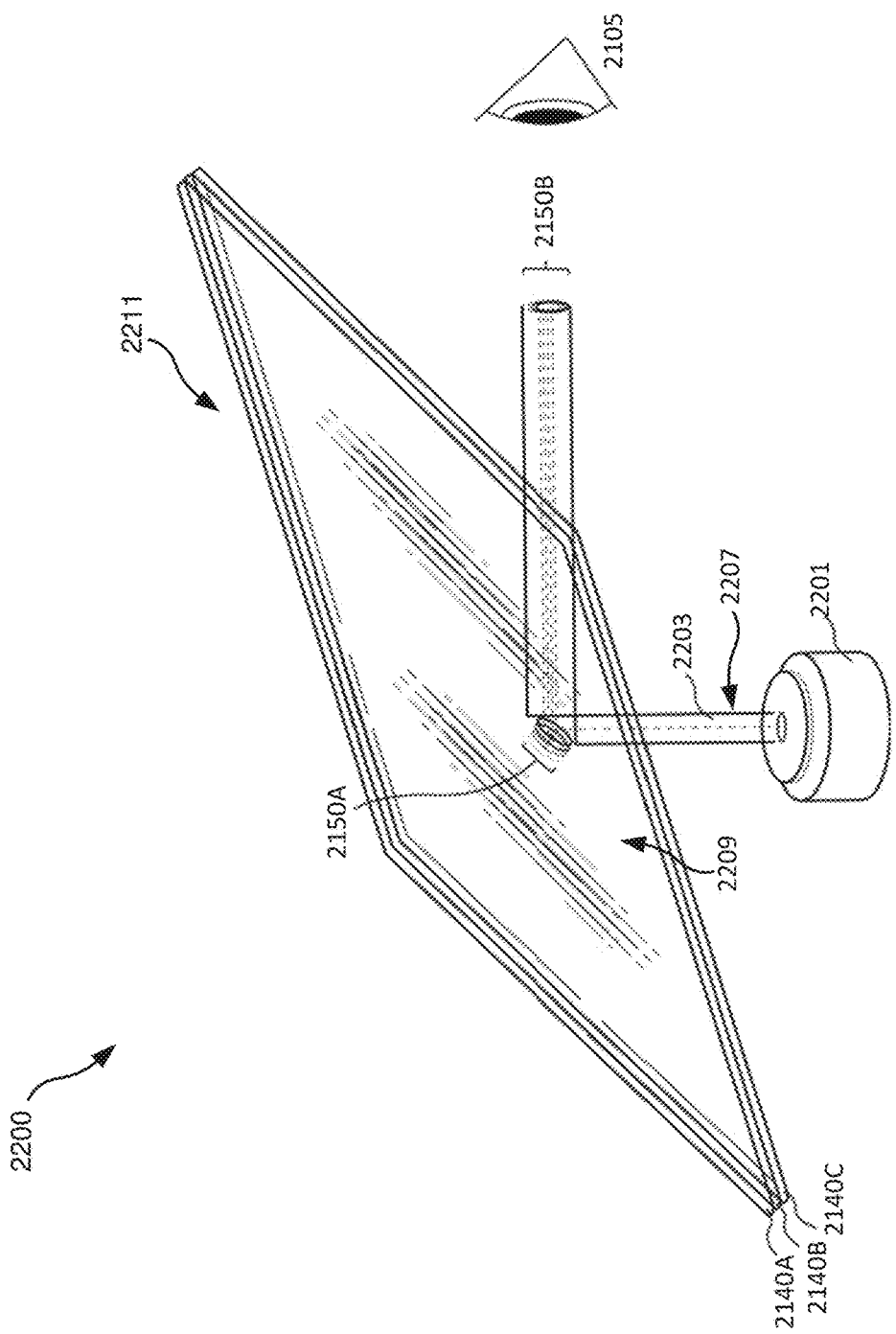
FIG. 22A provides a perspective view of an image projection system including a transparent and semi-reflective micro-layered reflector structure for a foil sheeting in accordance with an embodiment.

Attention is now directed to FIG. 22A, which provides a perspective view of an image projection 2200 system including a transparent and semi-reflective micro-layered structure 2211 capable of implementing the foil or transparent reflective surface 434, 1134. As shown, an image projector 2201 projects a beam of light 2207, which carries an image 2203, onto a front surface 2209 of the micro-layered foil sheeting 2211, which may also be referred to hereinafter as the micro-layered foil sheeting 2211 or simply the foil sheeting 2211. As is described hereinafter, the foil sheeting 2200 is designed and constructed to cause light lost through refraction at the front surface 2209 to be redirected or "folded" back into the light beam originally reflected from the front surface 2209 of the foil sheeting 2211. In this way the foil sheeting 2211 effectively operates as a layered lens which may be used to improve the vibrant strength of optical projection systems, such as prism, beam-splitter, or peppers-ghost projection systems.

In one embodiment the foil sheeting 2211 includes thin layers of transparent materials 2140A, 2140B, 2140C (not limited in number) with defined indices of refraction per layer. This combination of two or more layers of material 2140 allows for most traditionally lost light energy to be redirected to the viewer 205 at the point of initial reflection 2150A. This causes the final reflected image 2150B to not only display the desired image 2203A, but at higher brightness and clarity. The chemical composition of the layers 2140 will typically be chosen to create minute differences in refractive indices. In one embodiment, the refractive index of each layer 2140 is offset to create a weaker initial reflection and focus higher light energy on the internal layers, thereby creating a stronger projected image that can be sustained by the tertiary layers as shown in FIG. 22B.

Turing now to FIG. 23, a cross sectional view is shown of an embodiment of the micro-layered foil sheeting 2211. As depicted in FIG. 23, the projected light image 2203 propagates along direction 2160 and contacts the front surface 2209 of the initial foil layer 2140C at an acute angle of incidence θ. The reflected light is bent and travels at a 45° angle toward the viewer 2205. The lost light, or light lost in refraction, then contacts a back surface 2309 of the initial foil layer 2140C, causing a reflection corresponding to a secondary image to also propagate to the viewer 2205. However, unlike in conventional systems such as the system 2100 of FIG. 1, in which the reflector material 2121 generally comprised of a relatively thick single layer of material, in the present system 2200 each layer of the multi-layer structure 2211 is preferably quite thin (e.g., <3 mils). This causes the paths of the reflections from the front surface 2209 and the back surface 2309 of the initial foil layer 2140C to be sufficiently close so as not to be perceived by the viewer 2205 as dual images, but rather as an essentially single brighter image 2170. Moreover, by incorporating multiple thin foil layers 2140, the foil sheeting 2211 produces multiple closely aligned reflections that reinforce each other and thereby "stack" the projected light so as to further brighten the image 2170.

The material thickness, and number of layers used per foil sheet or lens, is dependent on the refractive index of the foil base material, or varying indices, and the compounding haze, or clouding, which occurs with the combination of foil materials when stacking. For optimal visual clarity utilizing a base material with a haze of <0.15% within the foil sheeting is recommended. If the haze qualities of the material build to an unsatisfactory degree, the resulting image will become muddled or "cloudy". For the purposes of this disclosure, "haze" refers to the optical property of transparent polymer or glass materials in which impurities, surface roughness, optical irregularities, or other factors create a percentage of diffusion in light as it travels through the material.

Referring again to FIG. 23, the incident light further lost after propagating through the initial foil layer 2140C travels through a thin adhesive membrane layer 2141B. Any commonly used transparent or semi-transparent adhesive medium can be used, including, but not limited to: alloys, aromatic polymers, conductive adhesives, hot-melt adhesives, film and tape, rubber-based, micro encapsulated, solvent-based, resin and water based adhesives. A first portion of the light exiting the membrane layer 2141B is then reflected by front and rear surfaces of the second foil layer 2140B and a second portion of the light exiting the membrane layer 2141B impinges on membrane layer 2141A. As shown, light exiting the membrane layer 2141 is reflected by front and rear surfaces of the first foil layer 2140A.

The refractive index of the adhesive layers 2141A, 2141B should not be identical to that of the foil/prism layers 2140A, 2140B, 2140C. For example, the refractive index of the adhesive layers 2141A, 2141B should at a minimum be 0.25 higher than the refractive index of its adjacent foil layer 2140, though this is subject to alteration based on the thickness of the foil layers 2140. One objective of embodiments of the present foil design is to bend light, in refraction, through each adhesive layer 2141 (e.g., layer 2141B) at an altered angle than that of the subsequent foil layer (e.g., layer 2140B), and the previous foil layer (e.g., layer 2140C).

The final image 2170 presented to the viewer 2205 is ultimately comprised of the two initial reflection points of the first foil layer 2140C, two secondary reflection points from the second layer 2140B, and finally two additional reflections from the third layer 2140A. By using polymer or glass materials with high transparency and gloss, ultra clear overlay projections can be created using a multiplicity of layers to "stack" projected light.

Figure 24:
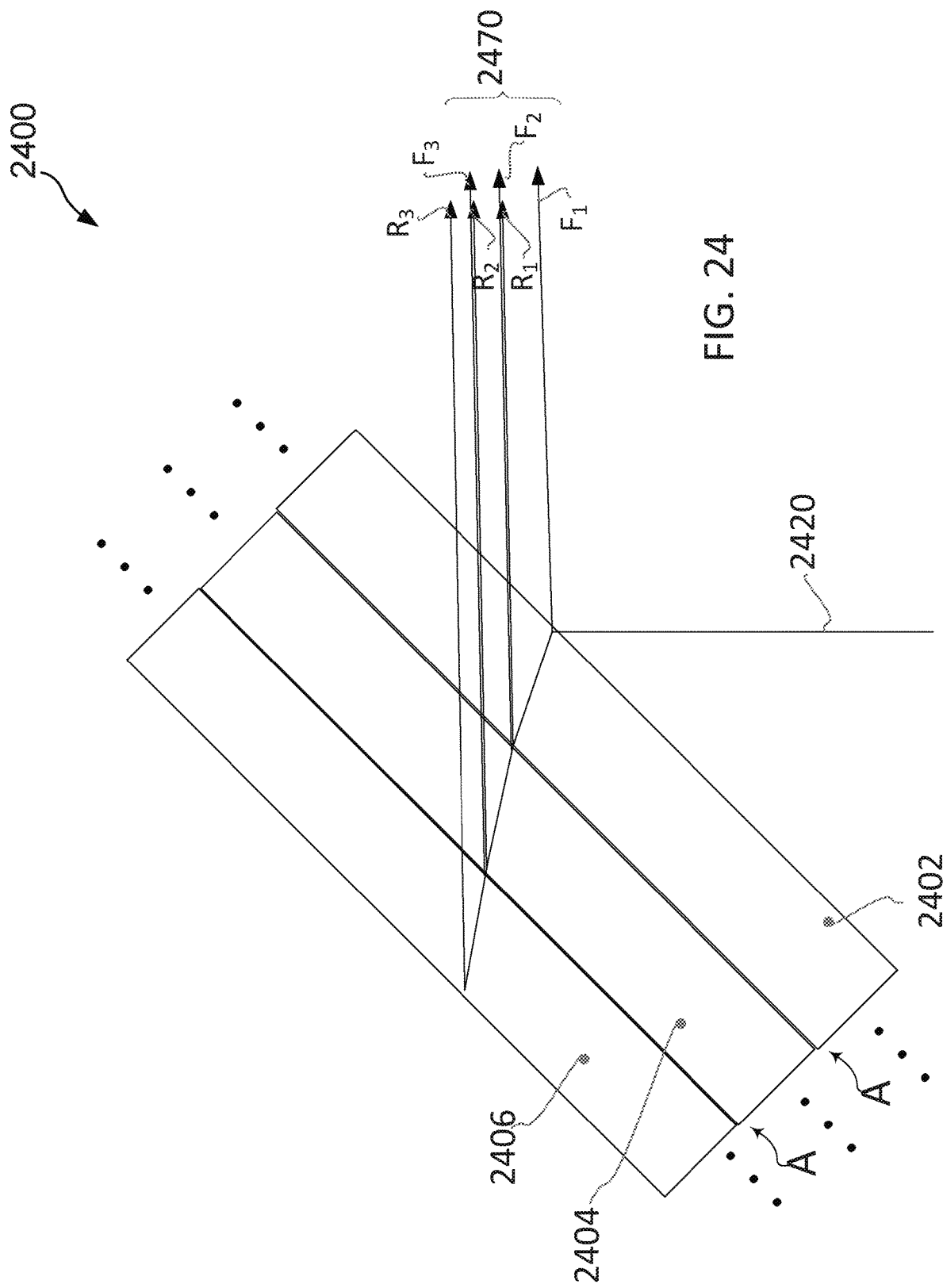
FIG. 24 provides a cross-sectional view of an alternate micro-layered reflector design for a foil sheeting in accordance with the disclosure.

Attention is now directed to FIG. 24, which provides a cross-sectional view of an alternate micro-layered reflector design in the form of a foil sheeting 2400. As may be appreciated from FIG. 24, it can be seen that the foil sheeting 2400 lacks adhesives between the layers of the base foil material, i.e., layers 2402, 2404, 2406. Rather, the periphery of the layers 2402, 2404, 2406 are air gapped. Air-gapping in this context refers to the omission of adhesive layers between the layers 2402, 2404, 2406 and instead sealing the edges of the layered stack via either tension, framing or heat sealing the laminate layers. In the embodiment of FIG. 24, the index of refraction of the second layer 2404 is larger than the index of refraction of the initial layer 2402, and the index of refraction of the third layer 2406 is larger than the index of refraction of the second layer 2404. Incident light 2420 from an input light beam contains an image and impinges on a front surface 2412 of the initial layer of material 2402. The jump in refractive index between the initial layer of material 2402 and the air (A) in contact with a rear surface 2414 of the initial layer allows for the reflection (R1) of incident light from the rear surface 2414 to remain closely associated with the reflection (F1) of incident light from the front surface 2412.

As shown in FIG. 24, image reflections (F1, F2, F3) reflected by the various front surfaces of the foil sheeting 2400 and the image reflections (R1, R2, R3) reflected by the various rear surfaces of the foil sheeting 2400 are collectively superimposed or stacked sufficiently in alignment so as to form a single image 2470 perceived by a user to be behind the foil sheeting. In the embodiment of FIG. 24 the thickness of each layer 2402, 2404, 2406 should be <0.5 mm in order to maintain appropriate alignment between and among the images (F1, F2, F3) reflected by the various front surfaces of the foil sheeting 400 and the images (R1, R2, R3) reflected by the various rear surfaces of the foil sheeting 2400. It has been found that optimum visible qualities appear at layer thicknesses of approximately 0.125 mm. In addition, as many layers as necessary may be added to generate the strongest possible image 2470.

Figure 25A:
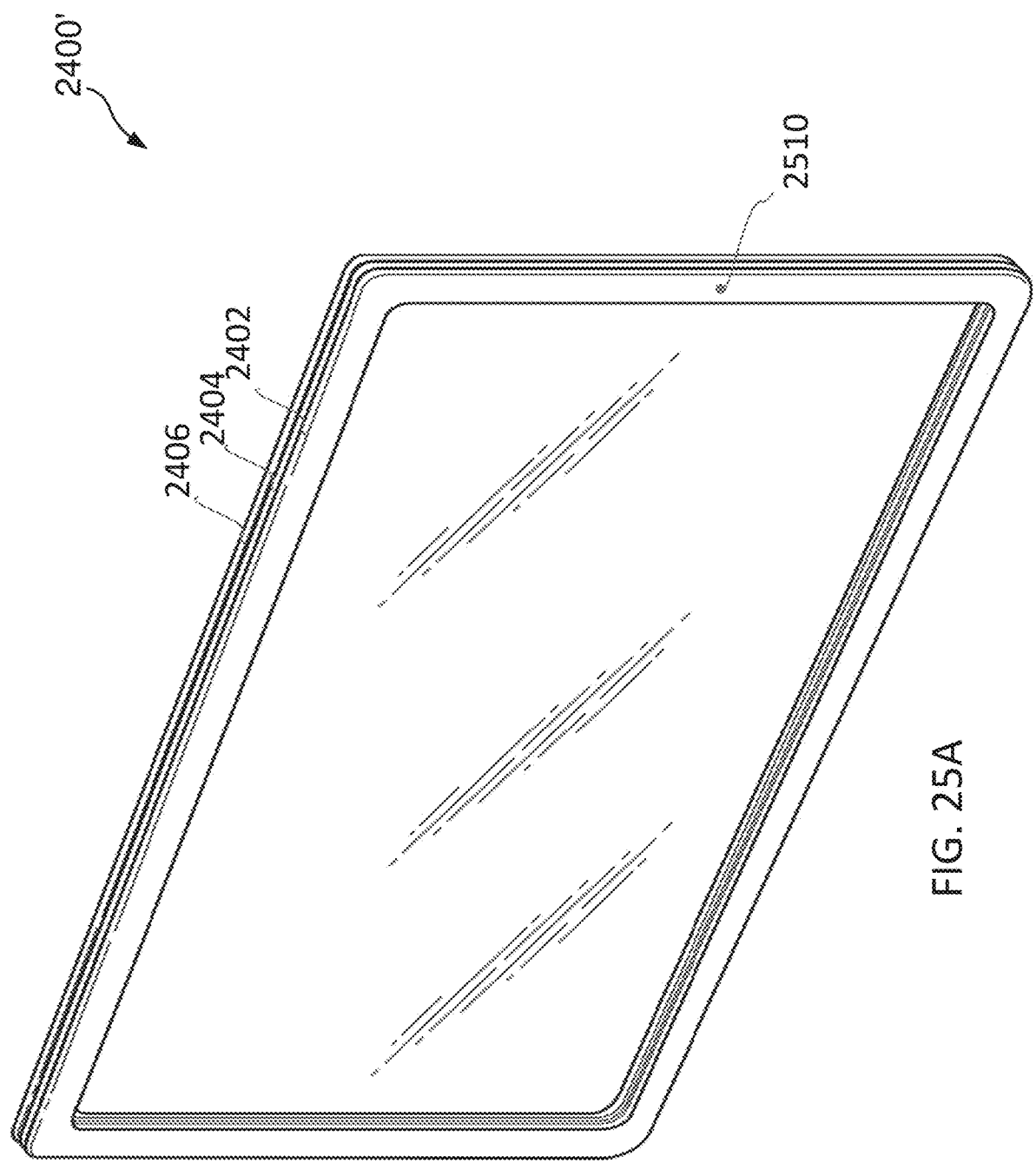
FIG. 25A is a perspective view of an air-gapped implementation of the foil sheeting of FIG. 24 which includes a framing structure surrounding the periphery of the multi-layer foil sheeting.
Figure 25B:
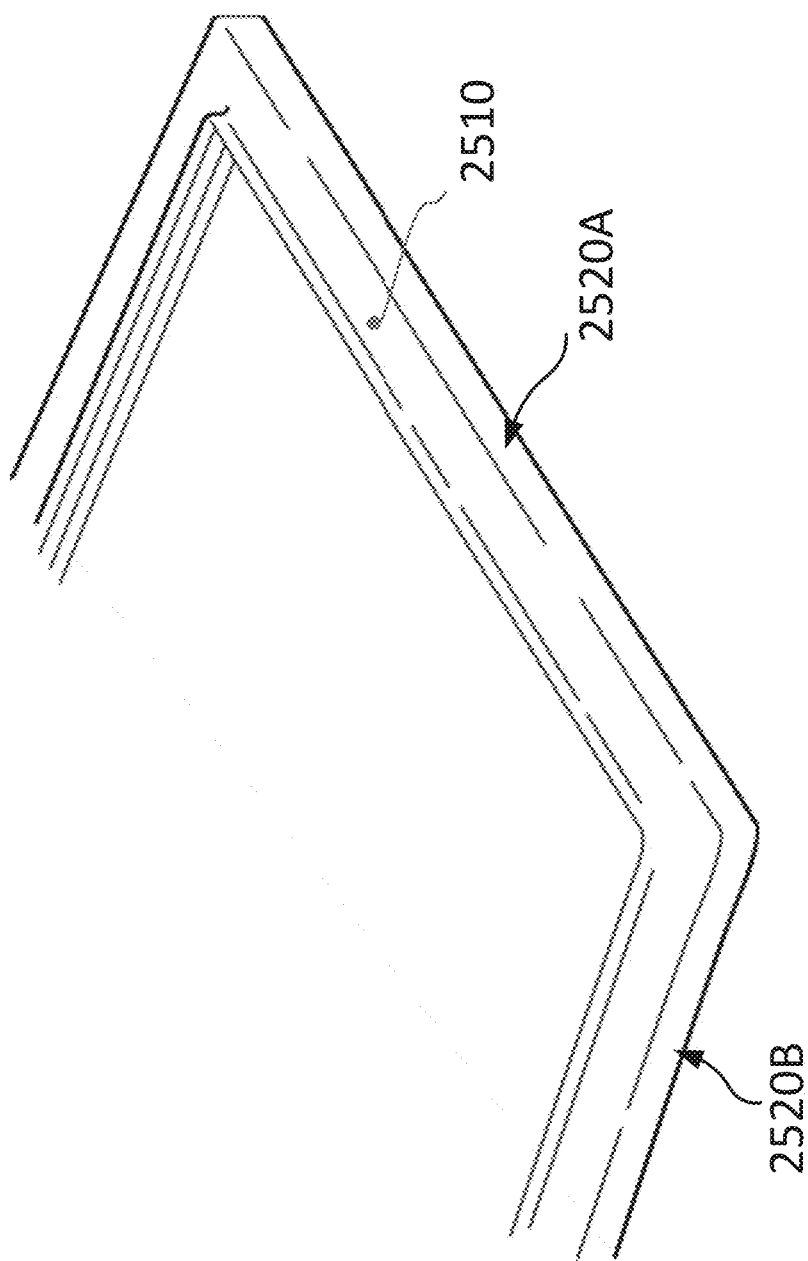
FIG. 25B is a magnified view of a portion of the air-gapped foil sheeting shown in FIG. 25A.

FIG. 25A illustrates an air-gapped implementation of the foil sheeting 2400' which includes a framing structure 2510 surrounding the periphery of the layers 2402, 2404, 2406. In the embodiment of FIG. 25 the layers 2402, 2404, 2406 may be mechanically compressed together and "snap fit" into the framing structure 2510. However, other approaches to sealing the periphery of the layers 2402, 2404, 2406 are within the scope of the air-gapped implementation of FIG. 25A. FIG. 25B is a magnified view of a portion of the air-gapped foil sheeting shown in FIG. 25A which illustrates the framing structure extending around sides 2520 of the foil sheeting 2400'.

The micro-layered structure disclosed herein is not limited to three layers, and, with a decrease in foil layer thickness, hundreds of layers can be used to create even denser micro-layer materials and structures. Similarly, the size of laminated multi-layer foils structured using the teachings herein can vary widely in dimension, from small handheld systems, to large, stage-dimension suspended foils.

In one embodiment the micro-layered material or structure may consist of three layers of polycarbonate, each with a thickness of 2 mils, a refractive index of 1.60, and the adjusted refractive index of the adhesive being 1.65 or higher. In another embodiment the micro-layered lens can be comprised of up to ten layers of glass or polymer, with a thickness of 1 mil or less, a refractive index of 1.50 or higher, and an adhesive refractive index of 1.55 or higher.

In another embodiment, the micro-layered lens can be comprised of more than fifteen micro-layers stacked and compressed together without the use of adhesive layers, with each micro-layer having an adjusted increase of refractive index by 0.15. By continually increasing the index of each micro-layer, light will continually bend in its refraction to create a steep arc, thus improving the final reflected image by keeping the multiplicity of reflections closer and condensed as they move behind the initial reflected image.

In another embodiment of the present semi-transparent lens arrangement the refractive indices of the constituent lens layers are not varied. Standard materials having suitable transmissive and reflective qualities for use in this embodiment include materials such as, for example: Glass, Lexan, Polycarbonate, PMMA, PET, PETG, PVC, PE, Ionomer Resins, PP, SMA, FEP, and all other transparent polymers. In one implementation the constituent layers are stacked with a given density of layers (>2) and are air-gapped or compressed. While this does not produce an optically stacked image with the same minute improvements as may be achieved through the manipulation of refractive indices, the thin materials of this lens arrangement will produce a significantly brighter image relative to systems using single layer reflectors to create optical projections.

An additional method of improving the optical clarity of projections in systems using the disclosed reflective foil sheeting or lens structure involves the addition of hard-coating deposits on the individual layers of each lens structure or foil sheeting. In one implement the surface of the initial reflection point is modified by hard-coating addition (sol-gel, thermal spray, vapor deposition). This allows the refractive index of layers made from standard materials (e.g., Glass, Lexan, Polycarbonate, PMMA, PET, PETG, PVC, PE, Ionomer Resins, PP, SMA, FEP, and all other transparent polymers) to significantly vary from the initial point of light incidence and reflection on the front of the layer to the point of secondary reflection on the back of the layer.

Figure 26:
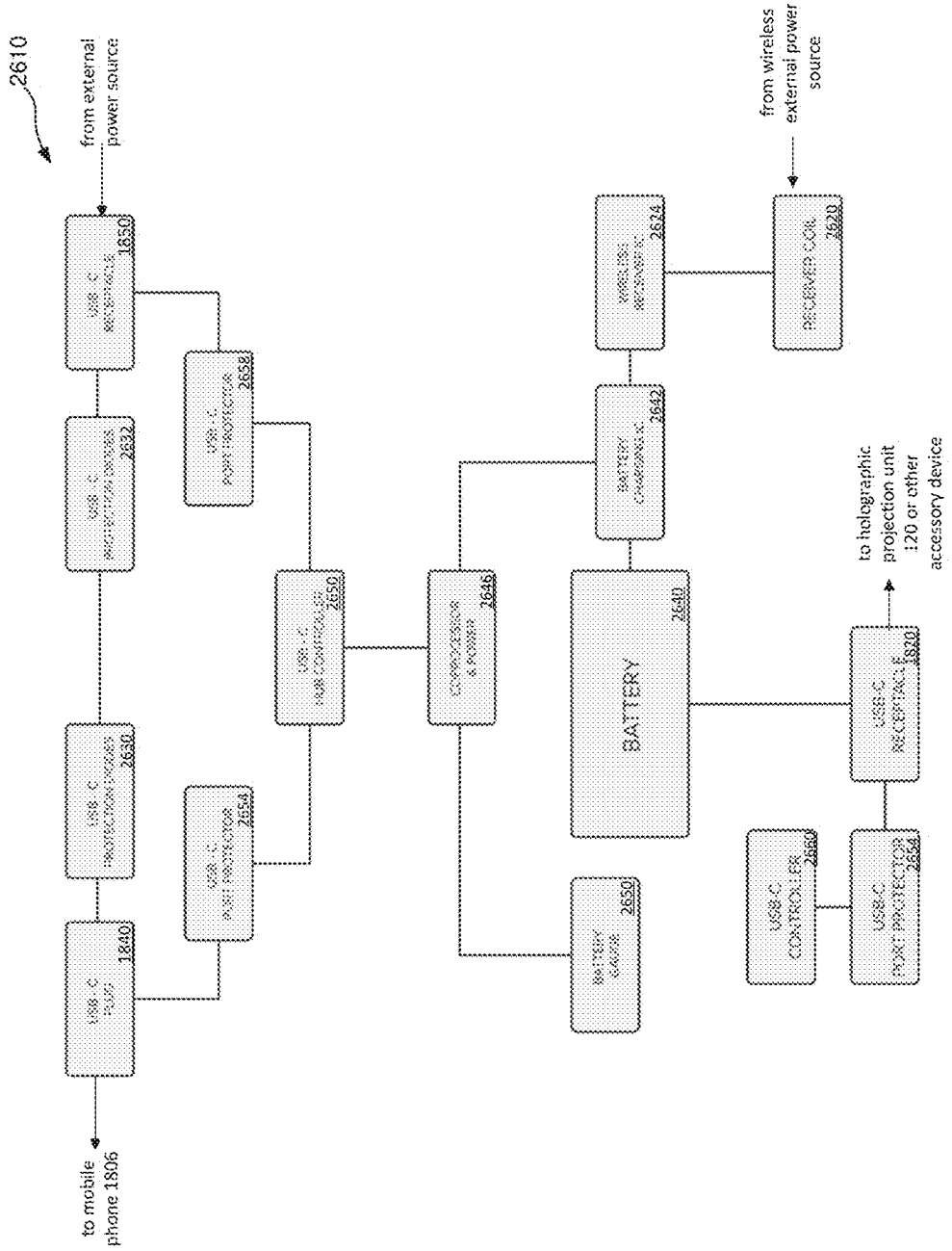
FIG. 26 is a block diagram of power storage and distribution elements included within an embodiment of an external power bank case.

FIG. 26 is a block diagram of power storage and distribution elements 2610 included within an embodiment of the external power bank case 1800. As discussed below, a USB-C or other controller is configured to negotiate power delivery by defining sources and sink requirements of various host and device combinations. In one embodiment the proposed architecture of the power distribution arrangement of FIG. 26 will use three USB-C connections: one for USB host (phone), one for the holographic projection device, and a third for USB-C power delivery from an external source.

As shown, the elements 2610 include the electrical plug 1840, such as a USB-C plug, which may connect to a corresponding USB-C receptacle of mobile phone 1806. The elements 2610 further include the secondary electrical receptacle 1820, which may be a USB-C receptacle, may be connected to a corresponding electrical plug of a holographic projection device or other phone accessory. The electrical receptacle 1850 may receive power from an external source. The elements 2610 may further include a receiver coil 2620 and a wireless receiver IC 2624 configured to wirelessly receive power from an external source. As shown, protection diodes 2630, 2632 are electrically connected to the electrical plug 1840 and the electrical receptacle 1850. Charging of a battery 2640 is controlled by a battery charging IC 2642, which is electrically connected to a co-processor 2646. The co-processor 2646 is also electrically connected to a battery gauge 2650.

When only the phone 1806 is electrically connected to the power bank case 1800 through plug 1840 and the battery 2640 is not being charged by an external source, power from the battery 2640 is distributed to the phone 1806 via the plug 1840. More specifically, the plug 1840 is electrically connected to a USB-C hub controller 2650 via a USB-C port protector 2654. When the battery 2640 is being charged by an external source (e.g., by an external source connected to hub controller 2650 via receptacle 1850 and port protector 2658), both the phone 1806 and battery 2640 may be simultaneously charged using the power from the external source.

The USB-C receptacle 1820 is connected to the battery 2650 via a USB-C controller 2660 and is also electrically connected to a port protector 2654. If the co-processor 2646 determines that a holographic projection unit or other device becomes connected to the secondary USB-C receptacle 1820, then power distribution may be diverted from the plug 1840 (connected to mobile phone 1806) to the secondary USB-C receptacle 1820 and its connected device (e.g., a holographic projection unit). More specifically, when the battery 2640 begins diverting power to the secondary USB-C receptacle 1820, the battery charging IC 2642 and co-processor 2646 register the change and in power distribution and divert power away from the USB-C plug 1840 and to the secondary USB-C receptacle 1820. In this way a holographic projection device or other device becoming connected to the secondary USB-C receptacle 1820 may essentially automatically receive power upon becoming connected.

Figure 27:
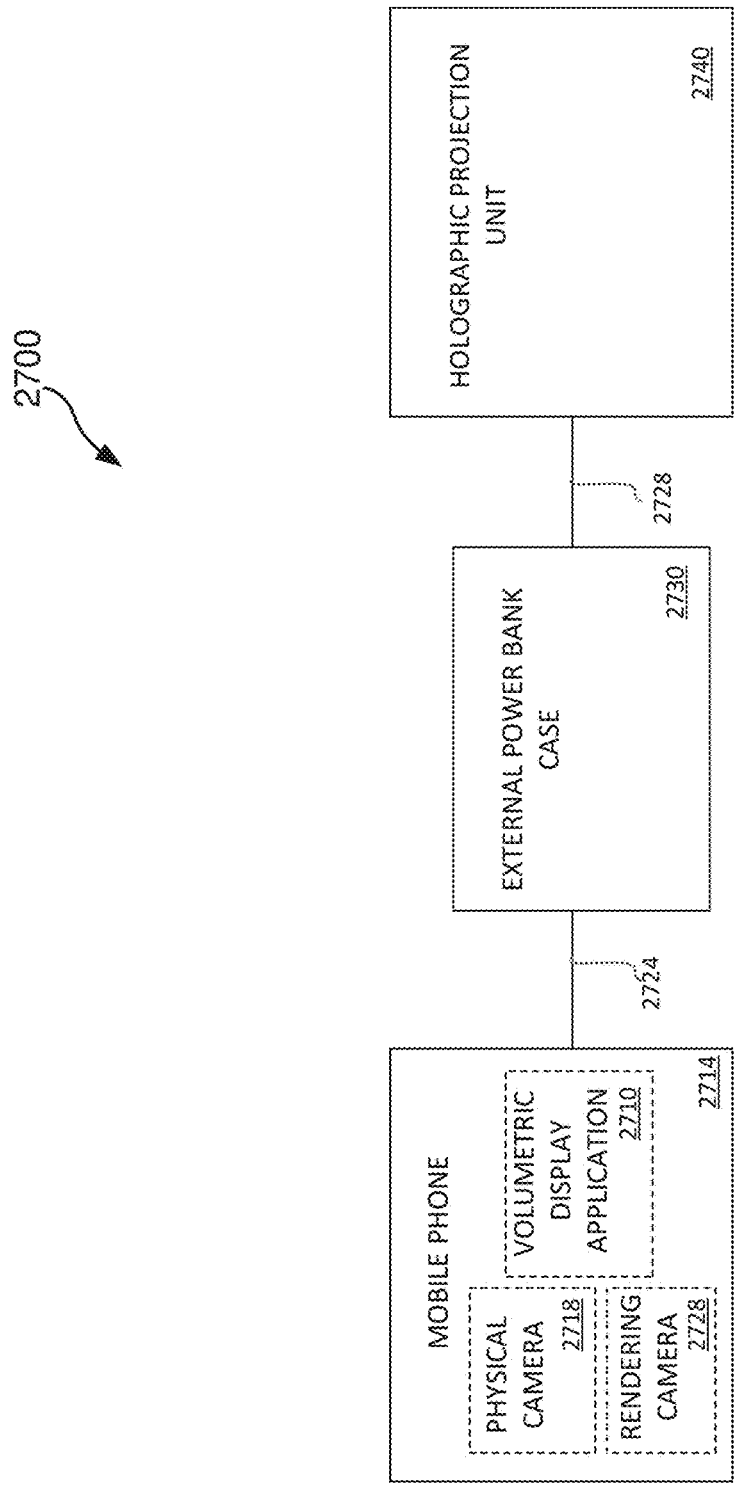
FIG. 27 provides a block diagrammatic view of a holographic projection system in accordance with an embodiment.

FIG. 27 provides a block diagrammatic view of a holographic projection system 2700 in accordance with an embodiment. The system 2700 includes a volumetric display application 2710 executed by a mobile phone 2714. The mobile phone 2714 may include standard user interface components including a front-facing camera 2718. The system 700 further includes an external power bank case 2730 and a holographic projection unit 2740 detachable from the external power bank case 2730. The external power bank case 2730 may physically attach to the mobile phone 2714 or other device via a magnetic connection facilitated by a mounting plate adhesively secured to a rear surface of the phone 2714. When connected to the mobile phone 2714 the external power bank case 2730 effectively acts as a phone case replacement.

The external power bank case 2730 electrically interfaces with the mobile phone 2714 over an electrical connection 2724 (e.g., a USB-C connection) so as to enable the external power bank case 2730 to provide power to the mobile phone 2714 and the mobile phone 2714 to provide video and other data to the external power bank case 2730. The external power bank case 2730 also electrically interfaces with the holographic projection unit 2740 over an electrical connection 2728 (e.g., a USB-C connection). The connection 2728 permits the external power bank case 2730 to power the holographic projection unit 2740 and to forward rendering data received from the volumetric display application 2710 to the holographic projection unit 2740 for volumetric display. During operation, the volumetric display application 2710 leverages a rendering camera 2728 to create views from specific x,y,z locations within a three-dimensional (3D) space being used by the system 2700 in order to facilitate volumetric projections, by the projection unit 2740, of image or video content stored on or otherwise received by the mobile phone 2714.

In what follows an implementation of the external power bank case 2730 is referred to as the "RYZ CASE", or simply "CASE", and an implementation of the holographic projection unit 2740 is referred to as the "RYZ DISPLAY", or simply the "DISPLAY". The external power bank case 2730 and the holographic projection unit 2740 may be referred to collectively as the "RYZ".

In one embodiment CASE and DISPLAY will include two separate PCBA's. The RYZ CASE electronics will include physical interfacing for the phone platform (USB-C connector, battery, battery charging (phone & CASE), power conditioning for CASE electronics, and an USB-C in PD mode for external power charging.

The RYZ DISPLAY may utilize up to two SuperSpeed modes and a eDP to LVDS (or MIPI) bridge to interface to the display driver along with PCAP interface (via I2C). The connection 2728 between CASE & DISPLAY will be compatible with standard USB-C (data & power).

In one embodiment there are three primary PCB utilized for the RYZ. One in the CASE that will include battery charging, DC-DC, and data pass through. The second PCB will be under the TFT display within the DISPLAY. The third PCB is referred to as the display bar PCB, which acts as a pass-through board for the signals between the PCB in the CASE and the PCB in the DISPLAY. The PCBA for the DISPLAY may interface with the TFT display controller and PCAP touchscreen controller.

As discussed above, the CASE may interface to the mobile phone via a USB-plug. The electrical interface between the CASE and the detachable DISPLAY will be facilitated via blind mate USB-C to USB-C (receptacle to plug) USB interfacing. The RYZ may use USB-C plug & receptacle connectors that will connect the RYZ with the mobile phone while the CASE is attached. This will support communication between the RYZ and mobile phone via USB and will provide a power path to the mobile phone.

In one embodiment the volumetric display application 2710 or other applications executing on the mobile phone 2714 are intended to do all video processing and encoding for USB transport. The embedded system will consist of the USB interface device with sufficient USB endpoints and DMA to directly transfer encoded video data to decoder via hardware means only. RYZ firmware will be responsible for enumerating as a USB device with power delivery negotiated on phone. MCU's in CASE and DISPLAY sections will monitor and report data from touchscreen and power/battery subsystem.

In an exemplary embodiment a user will interact with the RYZ in the following ways: (i) power on/off by momentary or slider, (ii) display deployment button (mechanical only) for releasing display system from closed position, (iii) LED for battery fuel gauge. (iv) other LEDs in display bar.

Figure 28:
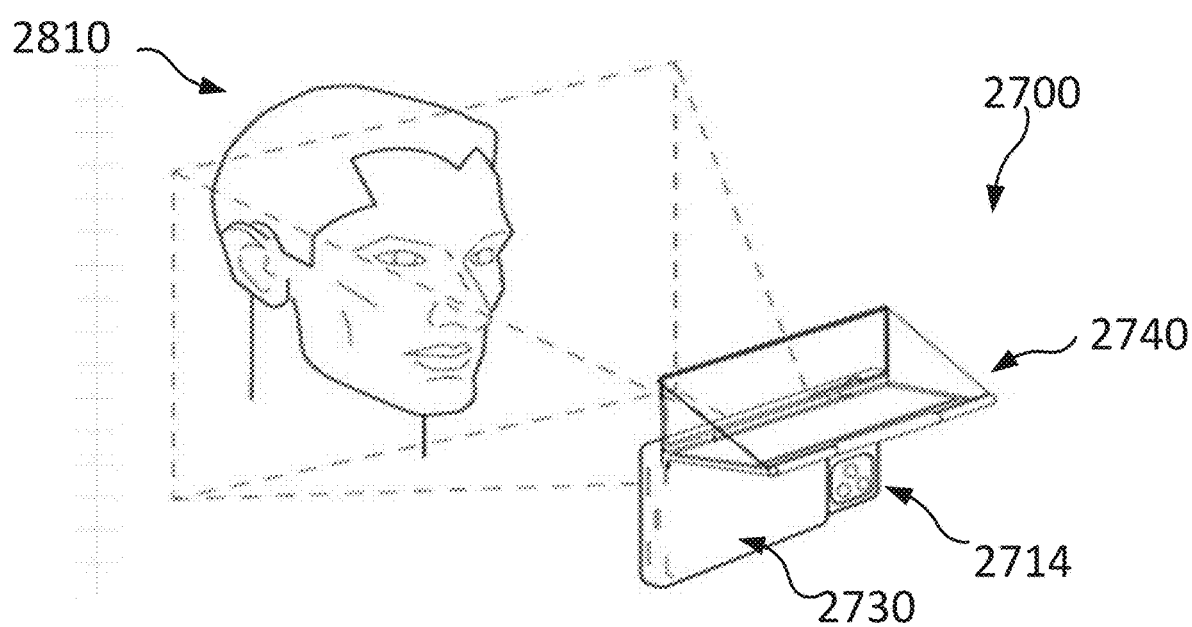
FIG. 28 illustrates a user engaged in viewing volumetric content projected by the holographic projection system of FIG. 27.

FIG. 28 illustrates a user 2810 engaged in viewing volumetric content projected by the holographic projection system 2700. As is discussed below, the camera 2718 of the mobile phone 2714 (e.g., a front facing camera) may be leveraged to track the face of the user 2810 and thereby enable corresponding adjustments to be made in the projected volumetric content in a way that enhances the user experience.

Figure 29A:
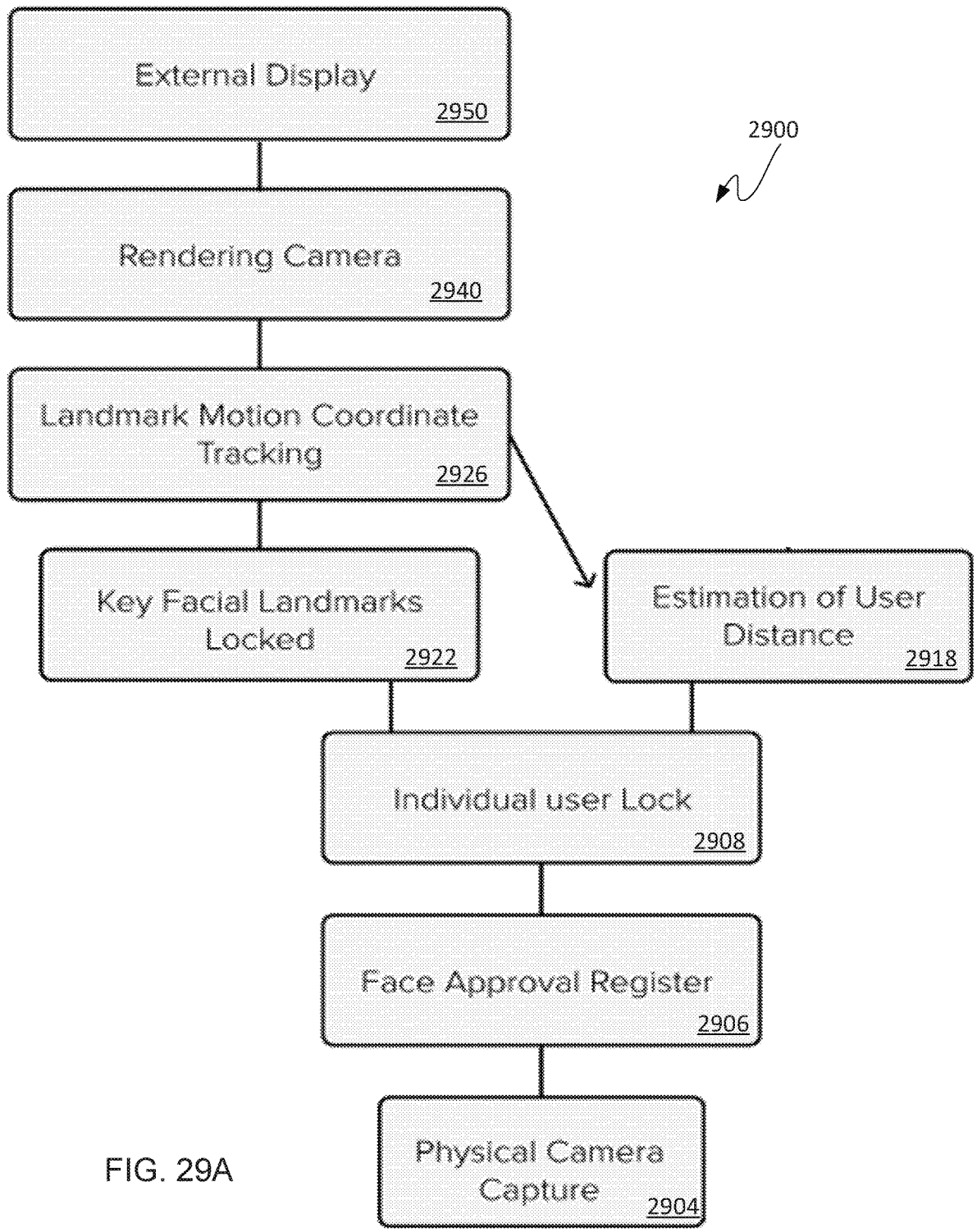
FIGS. 29A and 29B are representative of a process for utilizing the holographic projection system of FIG. 27 to create a perceived volumetric animation from a rendering environment.
Figure 29B:
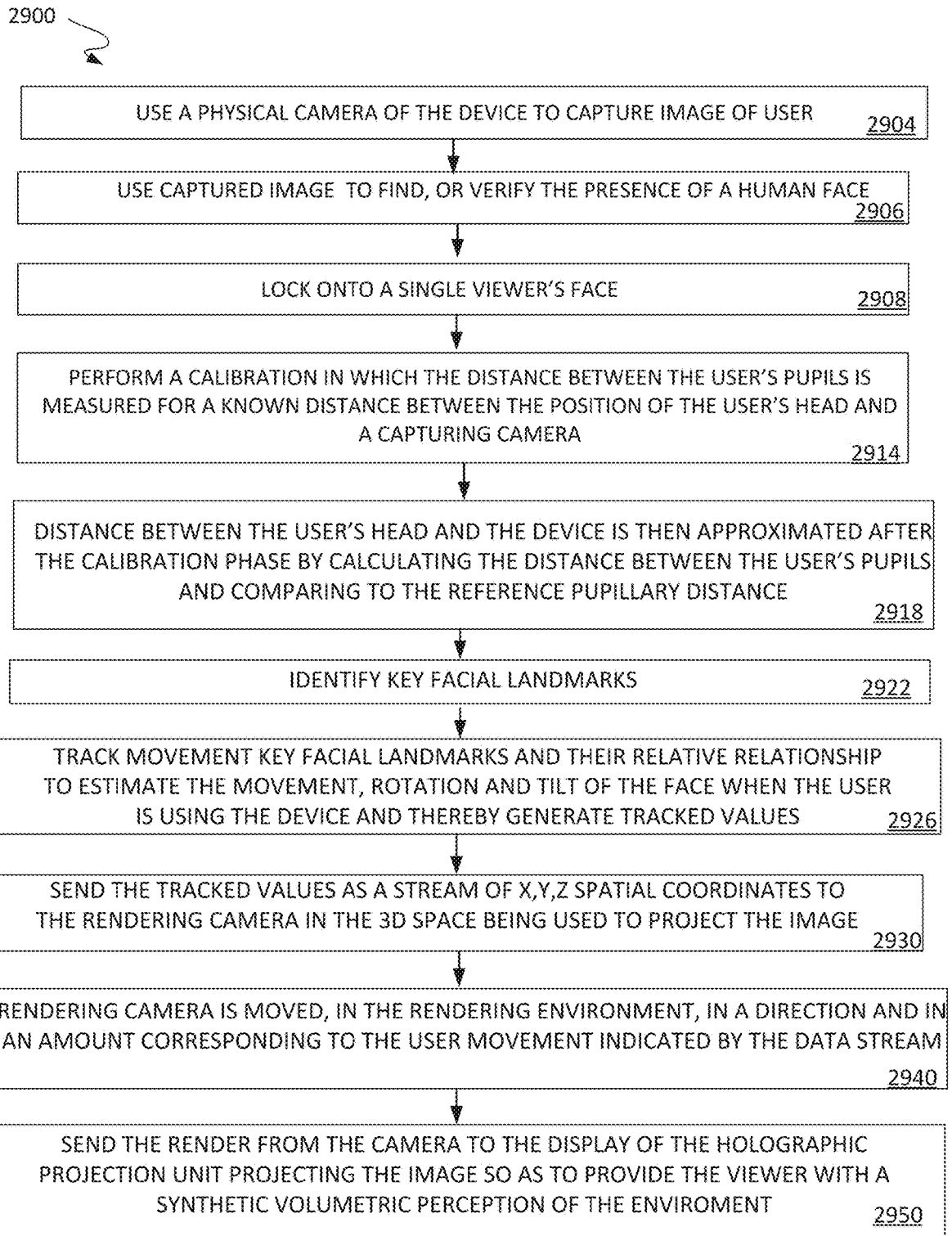

Attention is now directed to FIGS. 29A and 29B, which are representative of a process 2900 for utilizing the holographic projection system 2700 to create a perceived volumetric animation from a rendering environment. As is discussed below, the process 2900 uses using facial tracking coordinated by the volumetric display application 2710 to achieve the volumetric animation. FIG. 29A is a diagram illustrating principal stages of the process 2900; FIG. 29B provides a flowchart of the process 2900.

The process 2900 is initiated by using the camera 2718 of the mobile phone 2714 to capture an image containing the user 2810 (stage 2904). The volumetric display application 2710 then uses the captured image to find, or verify the presence of, a human face (stage 2906) and to lock on to a single viewer's face, i.e., the face of the user 2810 (stage 2908). A calibration is performed in which the distance between the pupils of the user 2810 is measured for a known distance between the position of the user's head and the camera 2718 (stage 2914). As the user 2810 interacts with the projection system 2700, the volumetric display application 2710 approximates the distance between the head or face of the user 2810 and the camera 2718 by calculating the distance between the user's pupils and comparing the calculated distance to the reference pupillary distance determine during the calibration phase (stage 2918). Increases in the calculated pupillary distance correspond to relative movement of the face or head of the user 2810 away from the camera 2718 and decreases in the calculated pupillary distance correspond to head movement toward the camera 2718. Key landmarks of the face of the user 2810 are then identified by the volumetric display application 2710 (stage 2922).

Once the key facial landmarks of the user 2810 have been identified, the application 2710 tracks movement of such landmarks and their relationship in order to estimate the movement, rotation and tilt of the face of the user 2810 and thereby track values of the key facial landmarks (stage 2926). The tracked values are then sent as a stream of x,y,z, spatial coordinates to the rendering camera 2728 in the 3D rendering environment being used to project the image (stage 2930). The rending camera 2728 is then moved within the rendering environment in a direction and in an amount corresponding the user movement indicated by the stream of x,y,z spatial coordinates (stage 2940). The render from the rendering camera 2728 is then sent to the display of the holographic projection unit 2740 so as to provide the user 2810 with a synthetic volumetric perception of the environment being rendered by the system 2700.

Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded into one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A power bank assembly for use with a mobile device, the power bank assembly comprising:
   a first electrical interface configured for connection to the mobile device;
   a second electrical interface configured for connection to an accessory device intended for use with the mobile device;
   a battery connected to the first electrical interface and the second electrical interface; and
   a processor configured to (i) receive connection information indicating whether the mobile device is connected to the first electrical interface and whether the accessory device is connected to the second electrical interface, and (ii) selectively distribute power from the battery to one or both of the mobile device and the accessory device based at least in part upon the connection information;
   wherein the power bank assembly is configured to pass data received from the mobile device through the first electrical interface to the accessory device through the second electrical interface.

2. The power bank assembly of claim 1 wherein the power bank assembly is configured to pass additional data received from the accessory device through the second electrical interface to the mobile device through the first electrical interface.

3. The power bank assembly of claim 1 wherein the data includes video data displayed by the accessory device.

4. The power bank assembly of claim 1 wherein the processor is further configured to receive charging information indicative of whether the battery is being charged by an external power source, the processor being configured to allow power from the battery to be simultaneously distributed to both the mobile device and the accessory device when the charging information indicates the battery is being charged by the external power source.

5. The power bank assembly of claim 1 further including a third electrical interface configured for connection to an external power source for charging the battery.

6. The power bank assembly of claim 1 further including a receiver coil and a wireless charging circuit for wirelessly receiving power from an external source, the wireless charging circuit being electrically connected to the battery.

7. The power bank assembly of claim 6 further including a third electrical interface configured for connection to an additional external power source for charging the battery.

8. The power bank assembly of claim 1 wherein the processor is further configured to receive charging information indicative of whether the battery is being charged by an external power source, the processor being configured to divert distribution of power provided by the battery from the mobile device to the accessory device when the charging information indicates the battery is not being charged by the external power source.

9. The power bank assembly of claim 1 wherein the data received from the mobile device is provided by an application executing on the mobile device.

10. The power bank assembly of claim 1 wherein the first electrical interface is a first USB-C connection and the second electrical connection is a second USB-C interface, the power bank assembly further including a third USB-C connection configured for connection to an external power source.

11. A method performed by a power bank assembly having a first electrical interface configured for connection to a mobile device, a second electrical interface configured for connection to an accessory device intended for use with the mobile device and a battery connected to the first electrical interface and the second electrical interface, the method comprising:

receiving connection information indicating whether the mobile device is connected to the first electrical interface and whether the accessory device is connected to the second electrical interface;
selectively distributing power from the battery to one or both of the mobile device and the accessory device based at least in part upon the connection information; and
passing data received from the mobile device through the first electrical interface to the accessory device through the second electrical interface.

12. The method of claim 11 further including passing additional data received from the accessory device through the second electrical interface to the mobile device through the first electrical interface.

13. The method of claim 11 wherein the data includes video data displayed by the accessory device.

14. The method of claim 11 further including:
receiving charging information indicative of whether the battery is being charged by an external power source;
simultaneously distributing power from the battery to both the mobile device and the accessory device when the charging information indicates the battery is being charged by the external power source.

15. The method of claim 11 further including receiving, through a third electrical interface configured for connection to an external power source, power for charging the battery.

16. The method of claim 11 further including wirelessly receiving power from an external source and providing the power to the battery.

17. The method of claim 11 further including:
receiving charging information indicative of whether the battery is being charged by an external power source;
diverting distribution of power provided by the battery from the mobile device to the accessory device when the charging information indicates the battery is not being charged by the external power source.

* * * * *